(12) United States Patent
Gritti et al.

(10) Patent No.: US 11,825,571 B2
(45) Date of Patent: Nov. 21, 2023

(54) AVERAGE CURRENT CONTROL CIRCUIT AND METHOD

(71) Applicant: STMicroelectronics S.r.l., Agrate Brianza (IT)

(72) Inventors: Giovanni Gritti, Bergamo (IT); Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1 day.

(21) Appl. No.: 18/151,191

(22) Filed: Jan. 6, 2023

(65) Prior Publication Data

US 2023/0156881 A1 May 18, 2023

Related U.S. Application Data

(63) Continuation of application No. 17/487,999, filed on Sep. 28, 2021, now Pat. No. 11,582,843.

(51) Int. Cl.
*H05B 45/10* (2020.01)
*H02M 1/42* (2007.01)
*H05B 45/385* (2020.01)

(52) U.S. Cl.
CPC .......... *H05B 45/10* (2020.01); *H02M 1/4225* (2013.01); *H02M 1/4258* (2013.01); *H05B 45/385* (2020.01)

(58) Field of Classification Search
CPC .. H05B 45/385; H05B 45/3725; H05B 45/10; H05B 45/375; H05B 45/38; H05B 45/14; H05B 45/355; H05B 45/37; H05B 47/10; H05B 45/345; H05B 45/36; H05B 45/382; H05B 45/392; H05B 45/40; H05B 45/44;
(Continued)

(56) References Cited

U.S. PATENT DOCUMENTS 6,842,353 B2   1/2005   Yamada et al.
7,042,743 B2   5/2006   Pidutti et al.
(Continued)

OTHER PUBLICATIONS

Adragna, Claudio, "Design-Oriented Small-Signal Modeling of Primary-Side Regulated Flyback Converters," Power Conversion Applications Laboratory, STMicroelectronics s.r.l., 2018, 8 pages.
(Continued)

*Primary Examiner* — Monica C King
(74) *Attorney, Agent, or Firm* — Slater Matsil, LLP

(57) ABSTRACT

A control circuit includes an output terminal configured to be coupled to a control terminal of a transistor that has a current path coupled to an inductor; a transconductance amplifier configured to produce a sense current based on a current flowing through the current path of the transistor; and a first capacitor. The control circuit is configured to turn on the transistor based on a clock signal, integrate the sense current with an integrating capacitor to generate a first voltage, generate a second voltage across the first capacitor based on a first current, generate a second current based on the second voltage, generate a third voltage based on the second current, turn off the transistor when the first voltage becomes higher than the third voltage; discharge the integrating capacitor when the transistor turns off; and regulate an average output current flowing through the inductor based on the first current.

20 Claims, 12 Drawing Sheets

(58) Field of Classification Search
CPC .. H02M 1/4225; H02M 1/0009; H02M 3/156; H02M 1/08; H02M 3/33507; H02M 1/0025; H02M 1/0058; H02M 3/1584; H02M 3/33523; H02M 3/1588; H02M 1/4258; H02M 1/0032; H02M 1/0022; H02M 1/12; H02M 3/157; H02M 1/083; H02M 1/32; H02M 1/36; H02M 1/42; H02M 3/158; H02M 1/0048; H02M 1/0064; H02M 1/007; H02M 3/1586; H02M 1/0016; H02M 1/4208; H02M 1/4216; H02M 1/4241; H02M 3/07; H02M 3/335; H02M 3/33515; H02M 7/06; H02M 1/0006; H02M 1/0012; H02M 1/0054; H02M 1/084; H02M 1/14; H02M 1/15; H02M 1/38; H02M 1/44; H02M 3/075; H02M 3/076; H02M 3/1555; H02M 3/1582; H02M 3/315; H02M 3/33576; H02M 3/3376; H02M 7/04; H02M 7/12; H02M 7/217; H02M 7/2176; H02M 7/517

See application file for complete search history.

(56) References Cited

U.S. PATENT DOCUMENTS

| | | | |
|---|---|---|---|
| 7,848,126 | B2 | 12/2010 | Hartlieb et al. |
| 8,194,420 | B2 | 6/2012 | Tumminaro et al. |
| 8,270,190 | B2 | 9/2012 | Adragna |
| 8,305,004 | B2 | 11/2012 | Shao |
| 8,467,209 | B2 | 6/2013 | Adragna |
| 9,018,855 | B2 | 4/2015 | Chen |
| 9,042,127 | B2 | 5/2015 | Gong |
| 9,271,366 | B2 | 2/2016 | Yu et al. |
| 9,423,808 | B2 | 8/2016 | Tateishi et al. |
| 9,660,542 | B2 | 5/2017 | Schaemann et al. |
| 9,699,838 | B2 * | 7/2017 | Xu .................. H02M 7/12 |
| 9,699,840 | B2 | 7/2017 | Xu et al. |
| 9,755,511 | B2 | 9/2017 | Lee et al. |
| 9,800,148 | B2 | 10/2017 | Gritti et al. |
| 9,913,329 | B2 | 3/2018 | Gritti |
| 10,128,761 | B2 | 11/2018 | Gritti et al. |
| 10,236,774 | B2 | 3/2019 | Gritti |
| 10,241,322 | B2 | 3/2019 | Gritti et al. |
| 10,284,096 | B2 | 5/2019 | Gritti |
| 10,298,116 | B2 | 5/2019 | Gritti et al. |
| 10,461,658 | B2 | 10/2019 | Adragna |
| 11,005,361 | B2 | 5/2021 | Scappatura et al. |
| 11,374,483 | B2 | 6/2022 | Kazama et al. |
| 11,374,484 | B2 * | 6/2022 | Liang .................. H02M 3/156 |
| 2008/0180075 | A1 | 7/2008 | Xie et al. |
| 2008/0259656 | A1 | 10/2008 | Grant |
| 2009/0086513 | A1 | 4/2009 | Lombardo et al. |
| 2009/0316454 | A1 | 12/2009 | Colbeck et al. |
| 2010/0321956 | A1 | 12/2010 | Yeh |
| 2011/0018516 | A1 | 1/2011 | Notman et al. |
| 2012/0026765 | A1 | 2/2012 | Adragna |
| 2012/0026766 | A1 | 2/2012 | Adragna |
| 2014/0029316 | A1 | 1/2014 | Adragna |
| 2014/0097808 | A1 | 4/2014 | Clark et al. |
| 2016/0172981 | A1 | 6/2016 | Gritti et al. |
| 2016/0248323 | A1 | 8/2016 | Gritti et al. |
| 2016/0261199 | A1 | 9/2016 | Adragna et al. |
| 2016/0336861 | A1 | 11/2016 | Gritti |
| 2017/0019030 | A1 | 1/2017 | Sugawara |
| 2018/0375434 | A1 | 12/2018 | Biziitu et al. |
| 2020/0144923 | A1 | 5/2020 | Cohen |
| 2020/0158766 | A1 | 5/2020 | Nate et al. |
| 2020/0321855 | A1 | 10/2020 | Gritti |
| 2021/0099073 | A1 | 4/2021 | Hrinya et al. |
| 2021/0105875 | A1 | 4/2021 | Lyu |
| 2022/0034946 | A1 | 2/2022 | Nate et al. |

OTHER PUBLICATIONS

Hwu, Kuo-Ing et al., "Light-Emitting Diode Driver with Low-Frequency Ripple Suppressed and Dimming Efficiency Improved," IET Power Electron., vol. 7, Iss. 1, 2014, 9 pages.

Jane, Gwan-Chi et al., "Dimmable Light-Emitting Diode Driver with Cascaded Current Regulator and Voltage Source," ET Power Electronics, vol. 8, Iss. 7, Mar. 4, 2015, 7 pages.

SGS-Thomson Microelectronics, "UC3842 Provides Low-Cost Current-Mode Control," Application Note, 1995, 16 pages.

Shao, Jianwen, "Single Stage Offline LED Driver," STMicroelectronics, 2009, 5 pages.

STMicroelectronics, "Off-Line All-Primary-Sensing Switching Regulator," ALTAIR04-900, DocID18211 Rev 3, Oct. 2014, 29 pages.

Wu, Stockton, "Single-Stage High Power Factor Flyback for LED Lighting," RICHTEK, AN012, May 2014, 13 pages.

* cited by examiner

AVERAGE CURRENT CONTROL CIRCUIT AND METHOD

CROSS-REFERENCE TO RELATED APPLICATIONS

This application is a continuation of U.S. patent application Ser. No. 17/487,999, filed on Sep. 28, 2021, entitled "Average Current Control Circuit and Method" which application is hereby incorporated by reference herein in its entirety.

Further, this application is related to co-pending U.S. patent application Ser. No. 17/487,944, filed on the same day as this application, entitled "Average Current Control Circuit and Method,", and to co-pending U.S. patent application Ser. No. 17/487,966, filed on the same day as this application, entitled "QR-Operated Switching Converter Current Driver,", which applications are hereby incorporated by reference herein in their entirety.

TECHNICAL FIELD

The present disclosure relates generally to an electronic system and method, and, in particular embodiments, to an average current control circuit and method.

BACKGROUND

A light emitting diode (LED) driver is configured to provide sufficient current to light the LED. A switching voltage regulator may be used to drive a LED.

The intensity of light produced by the LED is related to the average current flowing through the LED. Generally, the higher the average current flowing through the LED, the higher the intensity of light produced by the LED. Thus, it is generally desirable to use a current driver for driving the LED, to accurately control the average current flowing through the LED.

Dimming of a LED is possible by controlling the average current flowing through the LED. For example, reducing the intensity of light produced by the LED may be achieved by reducing the average current flowing through the LED.

Fluctuations in the average current flowing through the LED may cause fluctuations in the light emitted by the LED. Thus, a switching converter current driver may be used to properly drive a LED by switching at a frequency higher than the flicker fusion threshold.

LED lamp drivers are often specified for a rated output current (sometimes programmable in a range by a user) and for a range of output voltages to power different types/lengths of LED string. Notably, the rated output current is normally specified with quite tight accuracy, often less than 5% overall.

It is also common for LED lamp drivers to provide dimming capability, i.e., the ability to reduce the LED current from the rated value down to low values (sometimes lower than 1%) to enable the user to lower the intensity of the light output of the LED string. It is generally desirable for the LED current reduction and the resulting light modulation to be seamless and flicker-free.

SUMMARY

In accordance with an embodiment, a control circuit includes: an output terminal configured to be coupled to a control terminal of a first transistor that has a current path coupled to an inductor; a transconductance amplifier configured to produce a sense current based on a current flowing through the current path of the first transistor; and a first capacitor, where the control circuit is configured to: turn on the first transistor based on a clock signal, integrate the sense current with an integrating capacitor to generate a first voltage, generate a first current, generate a second voltage across the first capacitor based on the first current, generate a second current based on the second voltage, generate a third voltage based on the second current, turn off the first transistor when the first voltage becomes higher than the third voltage; discharge the integrating capacitor when the first transistor turns off; and regulate an average output current flowing through the inductor based on the first current.

In accordance with an embodiment, a method for regulating an average output current flowing through an inductor includes: turning on a power transistor based on a clock signal, where a current path of the power transistor is coupled to the inductor; generating a sense current based on a current flowing through the current path of the power transistor; integrating the sense current with an integrating capacitor to generate a first voltage; generating a first current; generating a second voltage across a first capacitor based on the first current; generating a second current based on the second voltage; generating a third voltage across a second capacitor based on the second current; turning off the power transistor when the first voltage becomes higher than the third voltage; discharging the integrating capacitor when the power transistor turns off; and regulating the average output current based on the first current.

In accordance with an embodiment, a switching converter includes: a power transistor; a sense resistor coupled to a current path of the power transistor; an inductor coupled to the current path of the power transistor; a driver having an output coupled to a control terminal of the power transistor; a flip-flop having a first output coupled to an input of the driver, and a first input configured to receive a clock signal, where the flip-flop is configured to produce a first signal at the first output of the flip-flop, and where the flip-flop is configured to cause the power transistor to turn on using the first signal based on the clock signal; a first comparator having an output coupled to a second input of the flip-flop, where the flip-flop is configured to cause the power transistor to turn off using the first signal based on the output of the first comparator; a transconductance amplifier having a first and second inputs respectively coupled to first and second terminals of the sense resistor, and an output coupled to a first input of the first comparator; an integrating capacitor coupled to the output of the transconductance amplifier and to the first input of the first comparator; a first switch coupled to the integrating capacitor, the first switch configured to discharge the integrating capacitor when the power transistor turns off; a zero crossing detection circuit having an input coupled to the current path of the power transistor and to the inductor, where the zero crossing detection circuit is configured to generate a freewheeling signal based on a demagnetization of the inductor; a first current generator configured to generate a first current, the first current generator coupled to a first capacitor at a first node; a first resistor coupled between the first node and a reference supply terminal; a second switch coupled in series with the first resistor and configured to be controlled based on the freewheeling signal; a second current generator configured to generate a second current based on a voltage at the first node; a third switch coupled between the second current generator and a second input of the transconductance amplifier; and a fourth switch coupled between the third switch and the reference supply terminal.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials, and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a current switching converter (constant current source) LED driver, e.g., for use in solid-state lighting (SSL), such as for driving one or more LEDs as the load. In some embodiments, the load may not include a LED. Some embodiments may be implemented in applications different from SSL, such as industrial, consumer, ICT, white goods, etc., "as is," or with small adaptations. Some embodiments may be used in a voltage switching converter.

In an embodiment of the present invention, the average inductor current of a continuous conduction mode (CCM)-operated buck converter is regulated by sensing only the current flowing through a power transistor, where the regulated current is independent of the switching frequency of the buck converter. Some embodiments are based on a charge-mode control core that enables stable CCM operation with a fixed or quasi-fixed switching frequency. In some embodiments, a zero current detection (ZCD) circuit enables discontinuous conduction mode (DCM) operation with a nominally unaltered control scheme, which advantageously allows for good accuracy of output current regulation during analog dimming. In some embodiments, a voltage feedforward circuit compensates propagation delays making the regulated output current little sensitive to input and output voltage variations.

Figure 1:
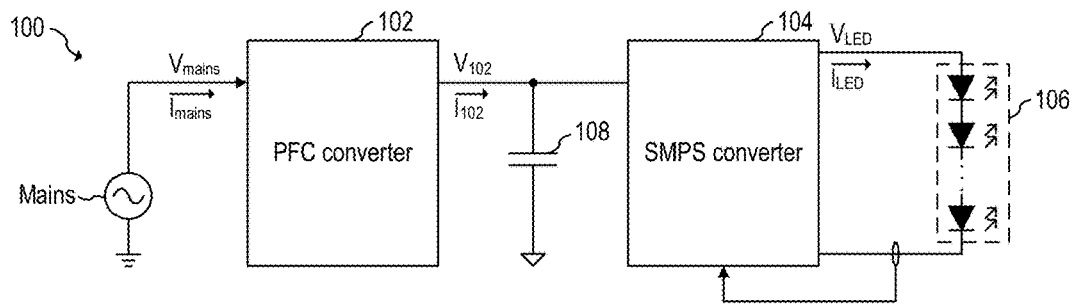
FIG. 1 shows a LED lamp driver, according to an embodiment of the present invention.

FIG. 1 shows LED lamp driver 100, according to an embodiment of the present invention. LED lamp driver 100 includes switched-mode power supply (SMPS) 102, and SMPS 104 for driving LED string 106. Switching converter 102 provides a regulated DC output voltage $V_{102}$ across energy storage capacitor 108 that supplies power to cascaded converter 104. Converter 104 provides a regulated output current that powers LED string 106.

In some embodiments, switching converter 102 may be implemented as a power factor corrector (PFC) front-end converter, which may draw a sinusoidal current $I_{mains}$ from the power line, in-phase with the sinusoidal line voltage $V_{mains}$ (e.g., 60 Hz, 110 $V_{rms}$; 50 Hz, 220 $V_{rms}$) may be used. Using a PFC front-end converter may advantageously achieve high power factor and low distortion of the input current. In some embodiments, using implementing switching converter 102 with PFC may advantageously help keep harmonic emissions low, which may advantageously help comply with standards such as the IEC61000-3-2, which sets class C harmonic emission limits for applications such as LED lamp drivers. In some embodiments, implementing converter 102 with PFC advantageously help keep total harmonic distortion (THD) of the input current $I_{mains}$ low.

AC/DC switching converter 102 may introduce ripple in the output current $I_{102}$. For example, current $I_{102}$ may exhibit a ripple with a high frequency component at the switching frequency of converter 102 (typically above 50 kHz), and a low-frequency component at twice the frequency of the AC power line (due to the pulsating nature of the power converter 102 draws from the power line and deliver to its output). The low-frequency ripple, if provided to LED string 106, may cause a reduction of the average LED current $I_{LED}$ for a given peak value, and may cause an increase in the operating temperature of the LEDs of LED string 106, which may shorten the lifetime of the LEDs of LED string 106. Such low-frequency ripple may also cause light fluctuations (flicker and shimmer), which may be undesirable if perceptible, and which have been reported to cause health problems even when imperceptible.

The PFC output voltage $V_{102}$ may be affected by a low-frequency ripple, generated by the low-frequency component of the output current $I_{102}$ ripple. Generally, converter 102 regulates the DC value of the output voltage $V_{102}$ by a low-bandwidth control loop to achieve high power factor and low distortion of the input current, but may be unable to reject the low-frequency output ripple.

In some embodiments, using a two-stage power conversion, such as shown in FIG. 1 (with front-end PFC converter 102 supply power to capacitor 108, and a cascaded post-regulator converter 104 supplying a regulated current to LED string 106) advantageously help prevent LED string 106 from being exposed to the ripple at the output of PFC converter 102. For example, in some embodiments, converter 104 provides a DC constant current $I_{LED}$, regulated by a wide-bandwidth control loop able to reject the low-frequency input voltage ripple, which advantageously optimizes the usage of LED string 106 and provides flicker-free operation of LED string 106.

In some embodiments, converter 102 may be implemented as a boost converter and converter 104 may be implemented as a buck converter. For example, in some embodiments delivering less than 100 W of power to LED string 106, voltage $V_{102}$ may be, e.g., between 100 V and 400 V, and converter 104 provides voltage $V_{LED}$ at a level that is appropriate for LED string 106, such as between 30 V and 60 V. In some embodiments, implementing converter 102 as a boost and converter 104 as a buck may advantageously keep current $I_{102}$ (and the relevant low-frequency ripple) low and may advantageously allow for implementing capacitor 108 without using a bulky, large value energy storage capacitor. Implementing converter 102 and 104 as a boost and buck converters, respectively, may also advantageously help in complying with safety extra low voltage (SELV) requirements, which limits $V_{LED}$ to 60 V.

In some embodiments, converter 102 may be implemented as a flyback converter, which may advantageously provide isolation from mains. Isolation from mains may advantageously help comply with electrical safety standards, such as IEC60950, IEC62368, IEC61347-1, for example.

Figure 2:
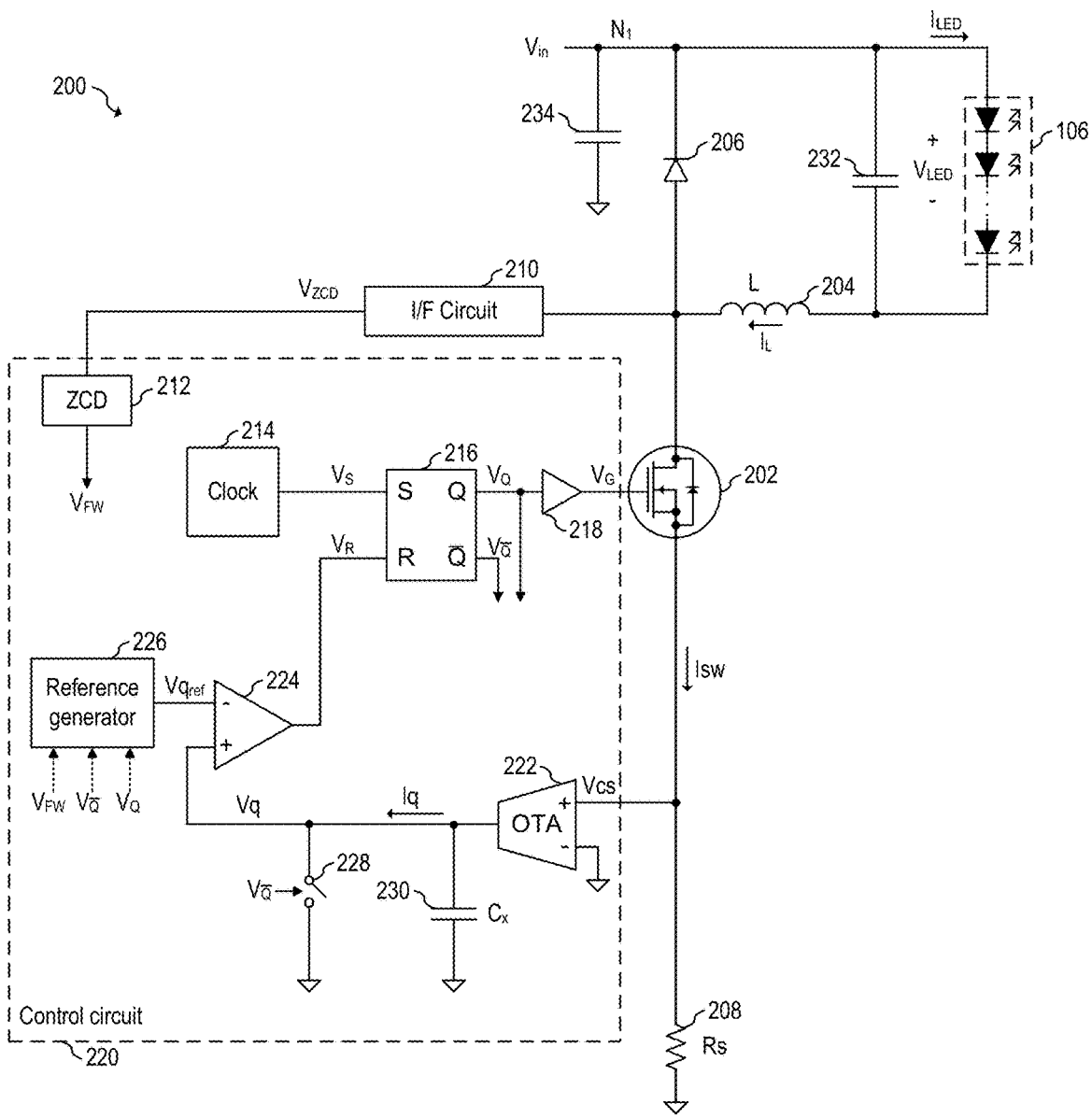
FIG. 2 shows a schematic diagram of a buck converter, according to an embodiment of the present invention.

FIG. 2 shows a schematic diagram of buck converter 200, according to an embodiment of the present invention. Buck converter 200 includes power transistor 202, interface (I/F) circuit 210, sense resistor 208, inductor 204, and control circuit 220. Control circuit 220 includes transconductance amplifier (OTA) 222, gate driver 218, zero-current detection (ZCD) circuit 212, flip-flop 216, clock circuit 214, capacitor 230, switch 228, comparator 224, and reference generator 226. SMPS 104 may be implemented as buck converter 200 (e.g., where node $N_1$ receives voltage $V_{102}$ as Vi).

Although LED string 106 is shown as the load driven by buck converter 200, in some embodiments, other loads, instead of or in addition to a LED string, may be driven by buck converter 200. For example, in some embodiments, load 106 may be a rechargeable battery.

As shown in FIG. 2, in some embodiments, power transistor 202 has a source terminal connected to ground, freewheeling diode 206 is connected to node $N_1$, and the load 106 is appended to node $N_1$ in series with inductor 204. Such configuration may advantageously allow for easier driving of transistor 202 compared to driving a floating power switch and allow for having control circuit 220 referred to ground, which may advantageously allow for simplified interfacing with lamp controls such as remote on/off, diming circuits, etc.

Converter 202 may be operated in continuous conduction mode (CCM). Operating converter 202 in CCM mode advantageously allow for a lower capacitance of output capacitor 232. Using a lower capacitance may advantageously allow for using ceramic capacitors instead of electrolytic capacitors, which may advantageously result in higher reliability and lower lifetime of converter 202. In some embodiments, output capacitor 232 may be omitted.

Converter 202 may be operated in discontinuous conduction mode (DCM), which may advantageously allow for good accuracy of current $I_{LED}$ at light loads (e.g., during analog diming). As will be described in more detail later, in some embodiments, ZCD circuit 212 enables DCM operation with a nominally unaltered control scheme (e.g., as given by Equation 11).

During normal operation (e.g., in CCM or DCM mode), power transistor 202 is turned on when pulses delivered by clock 214 set flip-flop 216. Power transistor 202 is turned off when flip-flop 216 is reset by comparator 224, which trips when voltage Vq is equal to voltage $Vq_{ref}$. In some embodiments, the pulses delivered by clock 214 have a fixed switching period $T_s$.

The current $I_{LED}$ delivered to LED string 106 is the average value of the inductor current $I_L(t)$ regardless of the operating mode. The portion Isw(t) of the inductor current $I_L(t)$ flowing through power transistor 202 during the on-time $T_{ON}$ of power transistor 202, is read through the voltage drop Vcs(t) across sensing resistor 208 and brought to the non-inverting input of OTA 222, whose inverting input is connected to ground.

OTA 222 outputs a current Iq(t) proportional to Vcs(t). For example, in some embodiments, current Iq(t) may be given by $$Iq(t) = g_m \cdot Vcs(t) \qquad (1)$$

where $g_m$ is the transconductance of OTA 222.

Current Iq(t) charges integrating capacitor 230 during a time $T_{ON}$. Capacitor 230 is reset by switch 228 as power transistor 202 is turned off and is kept discharged during the remaining part of the switching period $T_s$, so that Vq starts ramping up from 0 V during the next time power transistor 202 turns on.

During normal operation, irrespective of the operating mode (CCM or DCM), voltage Vq developed across integrating capacitor 230 may be given by $$Vq = \frac{g_m}{C_x} \int_0^{T_{on}} Vcs(t)dt = \frac{g_m}{C_x} \int_0^{T_{on}} Rs \cdot Isw(t)dt \qquad (2)$$

where $C_x$ represents the capacitance of capacitor 230, $T_{on}$ represents the time instant at which power transistor 202 is turned off, and Rs represents the resistance of sense resistor 208.

When buck converter 200 is operated in CCM mode, the current Isw(t) flowing through sense resistor 208 may be given by $$Isw_{CCM}(t) = I_{LED\_CCM} + \frac{V_{in} - V_{LED}}{L} \cdot \left(t - \frac{T_{ON}}{2}\right) \quad (3)$$

where $Isw_{CCM}(t)$ represents the current Isw(t) in CCM mode, $I_{LED\_CCM}$ represents the average current $I_{LED}$ in CCM mode, and L represents the inductance of inductor 204.

It follows from Equations 2 and 3 that voltage Vq, in CCM mode, may be given by $$Vq_{CCM} = \frac{g_m}{C_x} \cdot Rs \cdot I_{LED\_CCM} \cdot T_{ON}. \quad (4)$$

As will be described in more detail later, since the turn-off condition for power transistor 202 occurs when $Vq_{CCM}$ is equal to $Vq_{ref}$, reference generator 226 may be designed in such a way so as to generate reference voltage $Vq_{ref}$ so as to cause current $I_{LED\_CCM}$ to be independent from voltage $V_{LED}$ or input voltage $V_{in}$ (so that current $I_{LED\_CCM}$ does not vary based on voltage $V_{LED}$ or input voltage $V_{in}$). For example, in some embodiments, current $I_{LED\_CCM}$ may be given by $$I_{LED\_CCM} = \frac{1}{Rs} \cdot \alpha \cdot \frac{C_x}{g_m} \quad (5)$$

where $\alpha$ is a factor that may be dependent on internal fixed parameters, such as resistors and/or reference current(s) internal to controller 220.

As illustrated by Equation 5, in some embodiments, $I_{LED\_CCM}$ may be determined by a user-selectable parameter (e.g., external resistance Rs) and on internally fixed parameters ($C_x$, $g_m$, $\alpha$) and does not depend on voltage $V_{LED}$ of LED string 106, nor on the input voltage $V_{in}$ or the inductance L of inductor 204, nor on the switching frequency $F_{SW}$ $$\left(\text{where } F_{SW} = \frac{1}{T_S}\right).$$

When buck converter 200 is operated in DCM mode, the current Isw(t) flowing through sense resistor 208 may be given by $$Isw_{DCM}(t) = \frac{V_{in} - V_{LED}}{L} t \quad (6)$$

where $Isw_{DCM}(t)$ represents the current Isw(t) in DCM mode. The current $I_{LED}$ delivered to LED string 106 may be given by $$I_{LED\_DCM} = \frac{V_{in} - V_{LED}}{L} \cdot \frac{T_{ON}}{2} \cdot \frac{T_S - T_R}{T_S} \quad (7)$$

where $I_{LED\_DCM}$ represents the average inductor current $I_{LED}$ in DCM mode, and $T_R$ represents the time between the demagnetization time $T_{FW}$ (e.g., as indicated by voltage $V_{FW}$) and the turning on of power transistor 202 (thus, $T_R$ represents the time in which inductor current $I_L$ is zero and $T_S - T_R$ represents the time in which inductor current $I_L$ is greater than zero).

Substituting Equation 6 into Equation 2 and solving the integral yields $$Vq_{DCM} = \frac{g_m}{C_x} \cdot Rs \cdot \frac{V_{in} - V_{LED}}{L} \cdot \frac{T_{ON}^2}{2} \quad (8)$$

where $Vq_{DCM}$ represents the voltage Vq in DCM mode. In view of Equation 7, Equation 8 may be rewritten as $$Vq_{DCM} = \frac{g_m}{C_K} \cdot Rs \cdot I_{LED\_DCM} \cdot \frac{T_S}{T_S - T_R} \cdot T_{ON}. \quad (9)$$

As will be described in more detail later, since the turn-off condition for power transistor 202 occurs when $Vq_{DCM}$ is equal to $Vq_{ref}$, reference generator 226 may be designed in such a way so as to generate reference voltage $Vq_{ref}$ so as to cause current $I_{LED\_DCM}$ to be independent from voltage $V_{LED}$ or input voltage $V_{in}$ or switching period $T_S$ (so that current $I_{LED\_CCM}$ does not vary based on changes in voltage $V_{LED}$ or input voltage $V_{in}$ or switching period $T_s$). For example, in some embodiments, current $I_{LED\_DCM}$ may be given by $$I_{LED\_DCM} = \frac{1}{Rs} \cdot \alpha \cdot \frac{C_x}{g_m} \quad (10)$$

which is identical to Equation 5. Thus, in some embodiments, the average current $I_{LED}$ is advantageously independent of the operating mode (CCM or DCM) of the buck converter 200, e.g., as given by $$I_{LED} = I_{LED\_CCM} = I_{LED\_DCM} = \frac{1}{Rs} \cdot \alpha \cdot \frac{C_x}{g_m}. \quad (11)$$

Advantages of some embodiments include allowing for accurately controlling output current $I_{LED}$ in either CCM mode or DCM mode while only monitoring current Isw(t) flowing through power transistor 202. Thus, some embodiments advantageously achieve accurately controlling output current $I_{LED}$ in a low-cost, low-complexity manner, and without dissipating excessive energy. For example, some embodiments advantageously avoid using a resistor in series with the inductor for measuring the inductor current $I_L$. In some embodiments, avoiding use of a series resistor for measuring the inductor current may advantageously reduce power dissipation, avoid use of differential sensing with large common-mode dynamics and/or avoid use of a level shifter.

Additional advantages of some embodiments include achieving high output current ($I_{LED}$) accuracy, insensitive to the inductance value L, operating mode (DCM or CCM), switching period $T_S$, input voltage $V_{in}$, and LED string voltage $V_{LED}$. Some embodiments advantageous allow for accommodating different $V_{LED}$ settings without requiring external calibrations or correction means.

In some embodiments, control circuit 220 may be implemented in the same (e.g., monolithic) integrated circuit while elements 202, 204, 206, 208, 210, and 106 are implemented external to the integrated circuit (e.g., so that the integrated circuit may include a demagnetization sensing input for receiving voltage $V_{ZCD}$, e.g., as shown in FIG. 2).

Thus, some embodiments advantageously allow a user to accurately control current $I_{LED}$ by changing the resistance value Rs of an external component (208). In some embodiments, elements 206 and 210 are integrated in the same package external to the integrated circuit that includes control circuit 220. In some embodiments, elements 202 and/or 204 may be integrated in the same package external to the integrated circuit that includes control circuit 220.

In some embodiments, the circuits of buck converter 200 may be integrated in a different manner. For example, in some embodiments, elements 202 and/or 204 may be integrated in the same package as elements 206, 210, 212, 214, 216, and 218. In some embodiments, interface circuit 210 may be implemented inside the integrated circuit. In some embodiments, each of elements 106, 202, 204, 206, 208, 210, 212, 214, 216, 218, 222, 224, 226, 228 and 230 may be implemented in a discrete manner. Other implementations are also possible.

In some embodiments, control circuit 220 includes reference generator 226, comparator 224, switch 228, capacitor 230, and transconductance amplifier 222. Other implementations are possible. For example, in some embodiments, a portion or all of reference generator 226 may be implemented outside control circuit 220.

In some embodiments, capacitor 234 may be the output capacitor of a previous power stage. For example, in some embodiments, capacitor 108 is connected to node $N_1$, and capacitor 234 may be omitted.

Power transistor 202 may be implemented as a metal-oxide semiconductor field-effect transistor (MOSFET). Power transistor 202 may also be implemented in other ways. For example, in some embodiments, power transistor 202 may be implemented as a gallium nitride (GaN) transistor, or as an insulated-gate bipolar transistor (IGBT).

In some embodiments, clock 214 may be implemented in a conventional manner so as to generate a fixed-frequency clock signal $V_S$ (e.g., with period $T_S$). Operating buck converter 200 with a fixed frequency or with a substantially fixed frequency advantageously allows for using an optimized inductor that mitigates the efficiency drop at low dimming levels.

Interface circuit 210 is configured to generate voltage $V_{ZCD}$ based on current $I_L$ flowing through inductor 204. Voltage $V_{ZCD}$ may be used to sense the demagnetization instant of inductor 204 (e.g., by ZCD circuit 212).

In some embodiments, ZCD circuit 212 is configured to sense the onset of the voltage ringing of the floating terminal of inductor 204 (the drain terminal of power transistor 202) that occurs as current $I_L$ reaches 0 mA and produce a signal $V_{FW}$ indicative of the demagnetization time $T_{FW}$. For example, in some embodiments, ZCD circuit 212 includes a demagnetization sensing input for receiving the voltage $V_{ZCD}$ and generates signal $V_{FW}$ based on voltage $V_{ZCD}$ so that signal $V_{FW}$ is high during the demagnetization period of inductor 204. In some embodiments, ZCD 212 may be implemented in a conventional manner.

Figure 3:
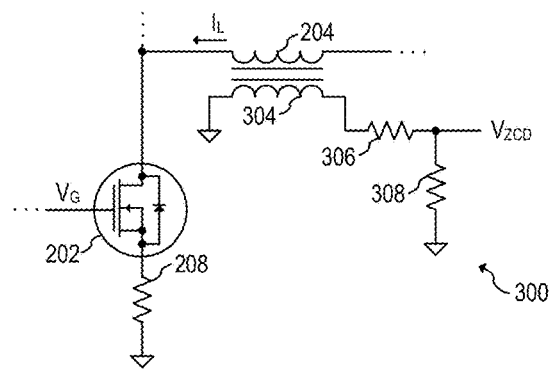
FIGS. 3 and 4 show schematic diagrams of interface circuits (I/F) of FIG. 2, according to embodiments of the present invention.

FIG. 3 shows a schematic diagram of interface circuit 300, according to an embodiment of the present invention. Interface circuit 210 may be implemented as interface circuit 300. Interface circuit 300 includes auxiliary winding 304 of inductor 204, and resistors 306 and 308 forming a voltage divider.

In some embodiments, auxiliary winding 304 tracks the voltage of the drain terminal of power transistor 202 and has a polarity such that its voltage is negative when power transistor 202 is on (during $T_{ON}$).

As shown in FIG. 3, interface circuit 300 generates voltage $V_{ZCD}$ based on $I_L$ current flowing through inductor 204. Voltage $V_{ZCD}$ may be used to sense the demagnetization instant of inductor 204 (e.g., by ZCD circuit 212).

Figure 4:
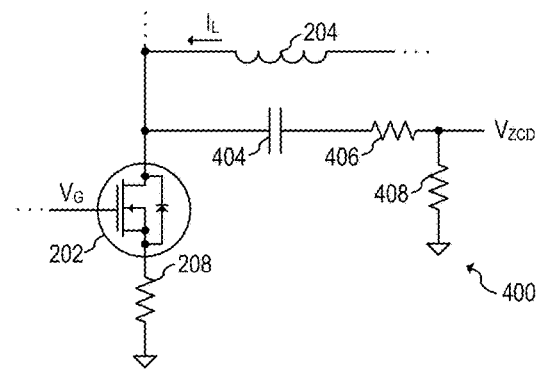

FIG. 4 shows a schematic diagram of interface circuit 400, according to an embodiment of the present invention. Interface circuit 210 may be implemented as interface circuit 400. Interface circuit 400 includes DC blocking capacitor 404 (e.g., connected to the drain terminal of power transistor 202), and resistors 406 and 408 forming a voltage divider. Similarly to interface circuit 300, voltage $V_{ZCD}$ may be used to sense the demagnetization instant of inductor 204 (e.g., by ZCD circuit 212).

Figure 5:
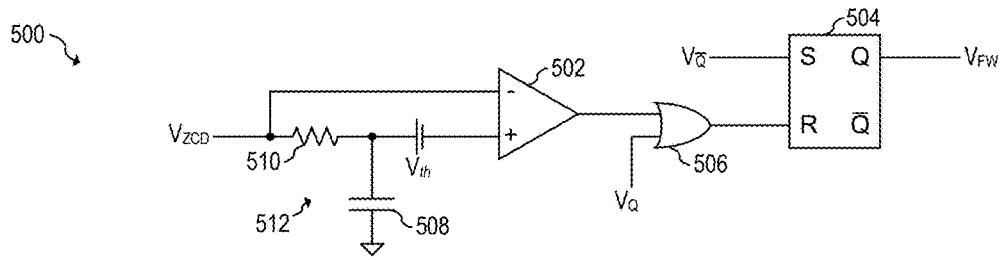
FIG. 5 shows a schematic diagram of a zero-crossing detection (ZCD) circuit, according to an embodiment of the present invention.

FIG. 5 shows a schematic diagram of ZCD circuit 500, according to an embodiment of the present invention. ZCD circuit 212 may be implemented as ZCD circuit 500. ZCD circuit 500 includes flip-flop 504, comparator 502, OR gate 506, and low-pass filter 512 including resistor 510 and capacitor 508. Low-pass filter 512, and comparator 502 form a negative-derivative detector.

In some embodiments, ZCD circuit 500 may be used to determine the demagnetization time $T_{FW}$ from the turning off of power transistor 202 to the current $I_L$ reaching 0 mA (in DCM mode). For example, as shown in FIG. 5, ZCD circuit 500 senses the onset of the voltage ringing of the floating terminal (drain) of power transistor 202 that occurs as inductor current $I_L$ zeroes by monitoring voltage $V_{ZCD}$ (e.g., as generated by interface circuit 300 or 400). Thus, in some embodiments, voltage $V_{FW}$ is reset (e.g., to logic low) when current $I_L$ reaches zero and is set (e.g., to logic high) when power transistor 202 is turned on (e.g., according to clock signal $V_S$). For example, in some embodiments (e.g., as shown in FIG. 5), since the inverting input of comparator 502 receives voltage $V_{ZCD}$, and the non-inverting input receives voltage $V_{ZCD}$ filtered by low-pass filter 512 and offset downwards by offset $V_{th}$, as $V_{ZCD}$ undergoes a negative edge, the output of low-pass filter 512 lags behind, and as their difference exceeds $V_{th}$, comparator 502 triggers, thus resetting flip-flop 504. In some embodiments, in CCM mode, the demagnetization time $T_{FW}$ is equal to the power transistor 202 off time $T_{OFF}$.

In some embodiments, offset $V_{th}$ may be a constant offset voltage, such as 25 mV. Other voltages (e.g., higher than 25 mV, such as 30 mV, or higher, or lower than 25 mV, such as 20 mV, or lower, may also be used).

Figure 6:
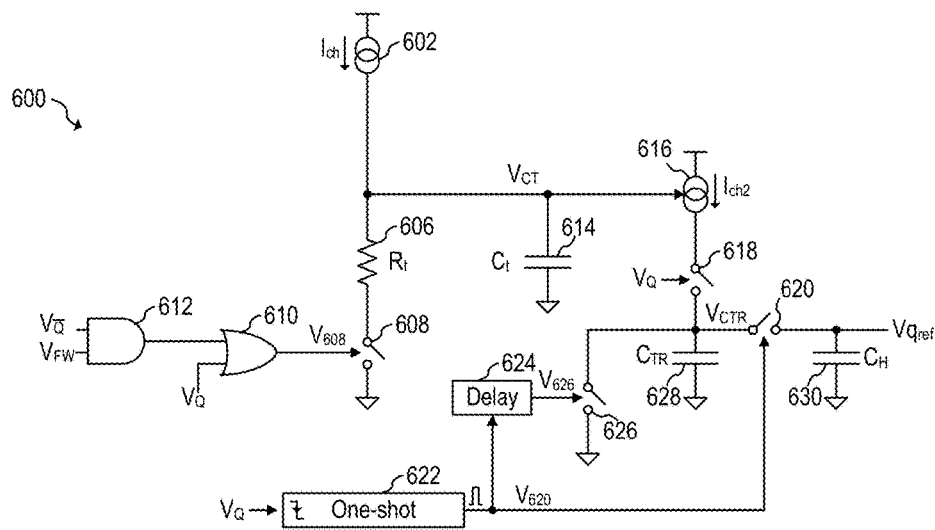
FIG. 6 shows a reference generator, according to an embodiment of the present invention.

FIG. 6 shows reference generator 600, according to an embodiment of the present invention. Reference generator 226 may be implemented as reference generator 600. Reference generator 600 includes current sources 602 and 616, 608, 618, 620 and 626, resistor 606, capacitors 614, 628, and 630, OR gate 610, AND gate 612, one-shot circuit 622, and delay circuit 624. As shown in FIG. 6, Reference generator 600 may be controlled by signals $V_Q$ and $V_{\overline{Q}}$ (e.g., from flip-flop 216) and signal $V_{FW}$ (e.g., from ZCD 212).

Figure 7:
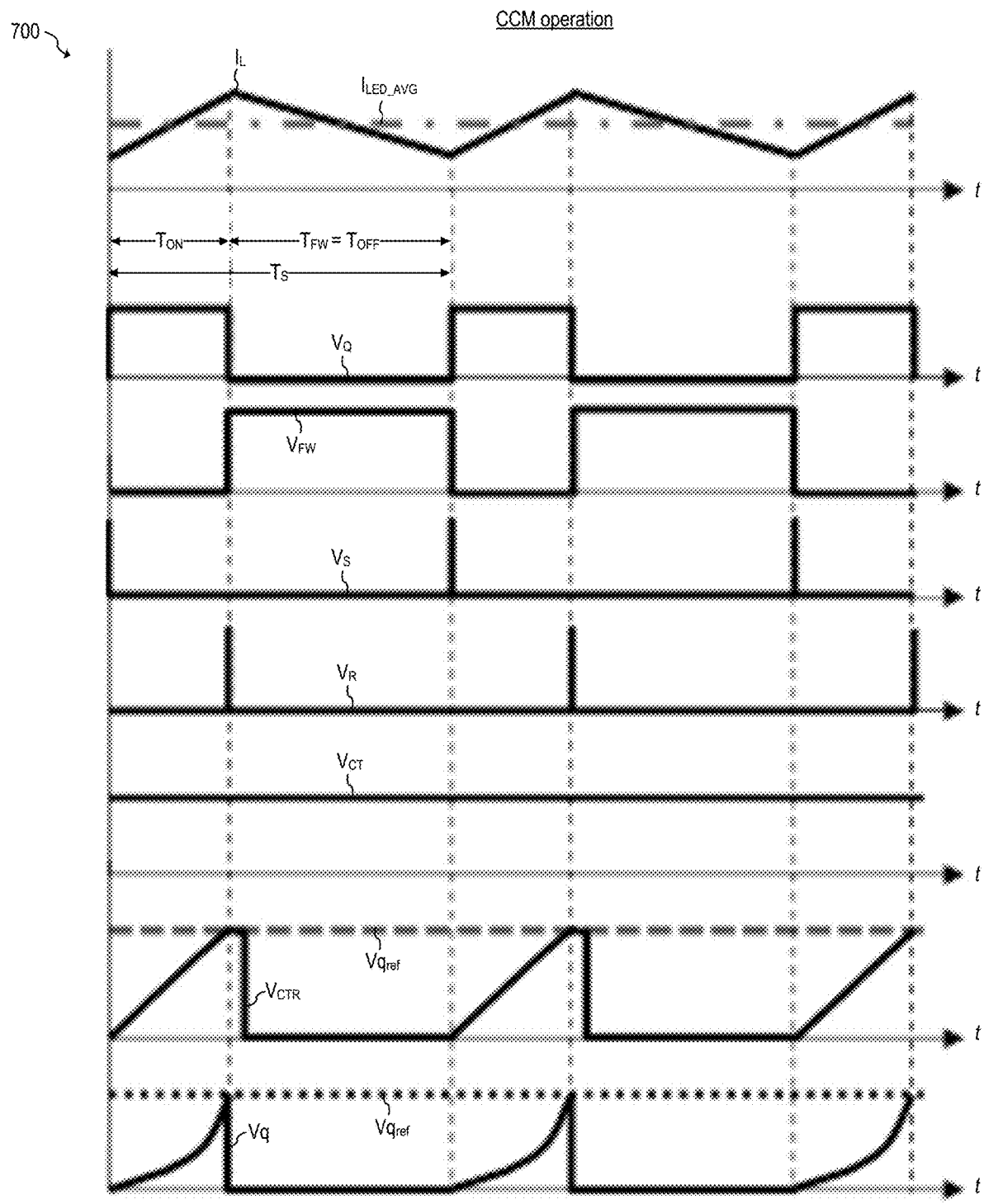
FIGS. 7 and 8 shows waveforms associated with the buck converter of FIG. 2, implemented with the reference generator of FIG. 6, and operating in continuous conduction mode (CCM) and discontinuous conduction mode (DCM) mode, respectively, according to an embodiment of the present invention.

FIG. 7 shows waveforms 700 associated with buck converter 200 implemented with reference generator 600, and operating in CCM mode, according to an embodiment of the present invention.

As can be seen in FIGS. 6 and 7, during CCM mode, switch 608 remains closed every clock cycle of clock $V_S$, as shown by signal $V_{608}$. Since switch 608 remains closed during CCM mode, the voltage $V_{CT}$ across capacitor 614 may be given by $$V_{CT} = R_t \cdot I_{ch} \qquad (12)$$

where $R_t$ represent the resistance of resistor 606, $C_t$ represents the capacitance of capacitor 614, and $I_{ch}$ represents the current generated by current source 602.

The voltage $V_{CT}$ across capacitor 614 is then converter to a current $I_{ch2}$, by voltage-controlled current source 616. Current $I_{ch2}$ may be given by $$I_{ch2} = g_{m2} \cdot V_{CT} \tag{13}$$

where $g_{m2}$ is the transconductance of voltage-controlled current source 616.

Since switch 618 is closed when power transistor 202 is on (during on-time $T_{ON}$), capacitor 628 is charged during on-time $T_{ON}$. As shown by one-shot circuit 622, as soon as signal $V_Q$ deasserts (thus, turning off power transistor 202), switch 620 is turned on for a predetermine period of time (e.g., 20 ns, as determined by one-shot circuit 622). A predetermined delay after signal $V_Q$ is deasserted (e.g., 100 ns, as determined by delay circuit 624), capacitor 628 is discharged through switch 626 (e.g., so that capacitor 628 is fully discharged the next time power transistor 202 turns on).

Assuming capacitance $C_H$ of capacitor 630 is substantially smaller than capacitance $C_{TR}$ of capacitor 628 (e.g., 10 times smaller, or more), capacitor 630 is charged to the same voltage $V_{CTR}$ of capacitor 628. Thus, the circuit including capacitors 628 and 630 and switches 618, 626 and 620 may be understood as a track and hold circuit.

Since during turn-on time $T_{ON}$, voltage $V_{CTR}$ increases linearly (since capacitor 628 is charged with a constant current $I_{ch2}$), and in view of Equations 12 and 13, reference voltage $Vq_{ref}$ may be given by $$Vq_{ref} = V_{CTR} = \frac{g_{m2} \cdot R_t \cdot I_{ch}}{C_{TR}} \cdot T_{ON} \tag{14}$$

Since power transistor 202 turns off when voltage $Vq$ is equal to voltage $Vq_{ref}$, and in view of Equations 4 and 14, current $I_{LED\_CCM}$ may be given by $$I_{LED\_CCM} = \frac{1}{Rs} \cdot \frac{g_{m2}}{g_m} \cdot \frac{C_x}{C_{TR}} I_{ch} \cdot R_t \tag{15}$$

where $\alpha$ is given by $$\alpha = \frac{g_{m2} \cdot I_{ch} \cdot R_t}{C_{TR}} \tag{16}$$

Figure 8:
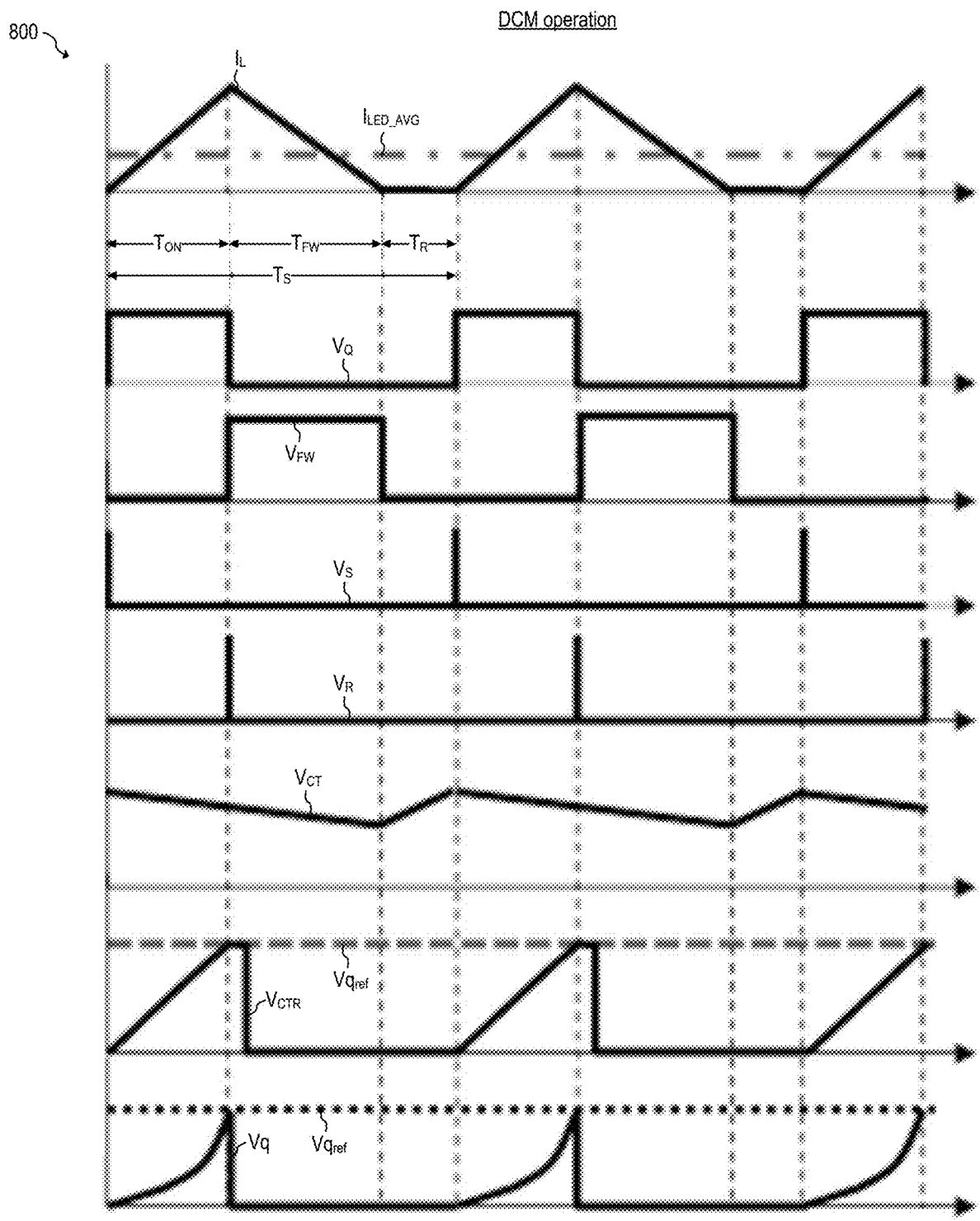

FIG. 8 shows waveforms 800 associated with buck converter 200 implemented with reference generator 600, and operating in DCM mode, according to an embodiment of the present invention.

As can be seen in FIGS. 6 and 8, during DCM mode, switch 608 is closed only while the inductor current $I_L$ is greater than zero (during the time interval $T_s-T_R$), and is open during the remaining part of the switching period $T_S$. Assuming that the time constant $R_t \cdot C_t$ is much larger than the switching period $T_S$ (e.g., 10 larger) voltage $V_{CT}$ may be given by $$V_{CT} = R_t \cdot I_{ch} \cdot \frac{T_S}{T_S - T_R} \tag{17}$$

Since capacitor 628 is charged with current $I_{ch2}$ during the turn-on time $T_{ON}$ of power transistor 202, and in view of Equations 13 and 17, voltage $Vq_{ref}$ in DCM mode may be given by $$Vq_{ref} = V_{CT} = \frac{g_{m2} \cdot R_t \cdot I_{ch}}{C_{TR}} \cdot T_{ON} \cdot \frac{T_S}{T_S - T_R}. \tag{18}$$

As can be seen, Equation 18 is valid also in CCM mode (e.g., if $T_R$ is equal to zero, Equation 18 is identical to Equation 14).

Based on Equations 9 and 18, in some embodiments, current $I_{LED\_DCM}$ may be given by $$I_{LBD\_DCM} = \frac{1}{Rs} \cdot \frac{g_{m2}}{g_m} \cdot \frac{C_x}{C_{TR}} I_{ch} \cdot R_t \tag{19}$$

where $\alpha$ is given by Equation 16. As shown, Equations 15 and 19 are identical, thereby leading to a control scheme of the average current $I_{LED}$ that is independent of the operating mode (CCM, DCM) of buck converter 200, which in some embodiments is captured by Equations 11 and 16.

In some embodiments, as can be seen in Equations 11 and 16, the average current $I_{LED}$, may depend only on resistance Rs (which may be user-selectable) and on internally fixed parameters $I_{ch}$, $R_t$, $C_x$, $g_m$, $C_{TR}$, and $g_{m2}$ and does not dependent on voltage $V_{LED}$ or $V_{in}$, or inductance L, or the switching period $T_S$, irrespective of the operating mode (CCM, DCM). For example, in some embodiments, the switching frequency $F_{SW}$ may be varied (e.g., between 130 kHz and 230 kHz) without causing a substantial change in the average current $I_{LED}$ (e.g., variation of less than 1% of the target average current value).

As can be seen in FIGS. 7 and 8, in some embodiments, voltage $Vq_{ref}$ is substantially constant withing the switching cycle (e.g., based on Equation 18 and given that $R_t \cdot C_t$ is much larger than the switching period $T_S$).

Some embodiments advantageously achieve high accuracy of control of average current $I_{LED}$ by matching current $I_{ch}$ (which may be generated based on a resistor) to resistance $R_t$ (e.g., resistance ratio), by matching transconductances $g_m$ and $g_{m2}$, which may also dependent on the same (or matched) resistor (not shown), and by matching capacitances $C_x$ and $C_{TR}$ (e.g., capacitance ratio).

In some embodiments, one shot circuit 622 is configured to produce a pulse of predetermined duration (e.g., 20 ns) when signal $V_Q$ transitions from high to low. Pulses of different durations (e.g., higher than 20 ns, such as 25 ns, 30 ns, or more, or lower than 20 ns, such as 18 ns, 15 ns, or less) may also be used. One-shot circuit 622 may be implemented in any way known in the art.

In some embodiments, delay circuit 624 is configured to generate signal $V_{626}$, which is a delayed version of signal $V_{620}$, where the delay between signals $V_{626}$ and $V_{620}$ is a predetermined delay (e.g., 100 ns). Delays of different durations (e.g., higher than 100 ns, such as 120 ns, 150 ns, or more, or lower than 100 ns, such as 90 ns, 85 ns, or less) may also be used. Delay circuit 624 may be implemented in any way known in the art.

In some embodiments, switch 618 may be omitted, e.g., by controlling an enable input of current source 616 using signal $V_Q$.

As illustrated by FIG. 2, the resettable integration circuit that includes switch 228 and capacitor 230 forms a charge-mode control core in which Vq is proportional to the electric charge drawn by buck converter 200 from input $V_{in}$ in a switching cycle during on-time $T_{ON}$. The charge-mode control core may exhibit subharmonic instability issues when buck converter 200 is operated in CCM mode and with fixed frequency (constant $T_S$).

In some embodiments, buck converter 200 transitions from CCM mode to DCM mode when the peak-to-peak ripple of inductor current $I_L$ is higher than twice the average of current $I_L$, which may advantageously help solve subharmonic instability issues when buck converter 200 is operated in CCM mode.

Figure 9:
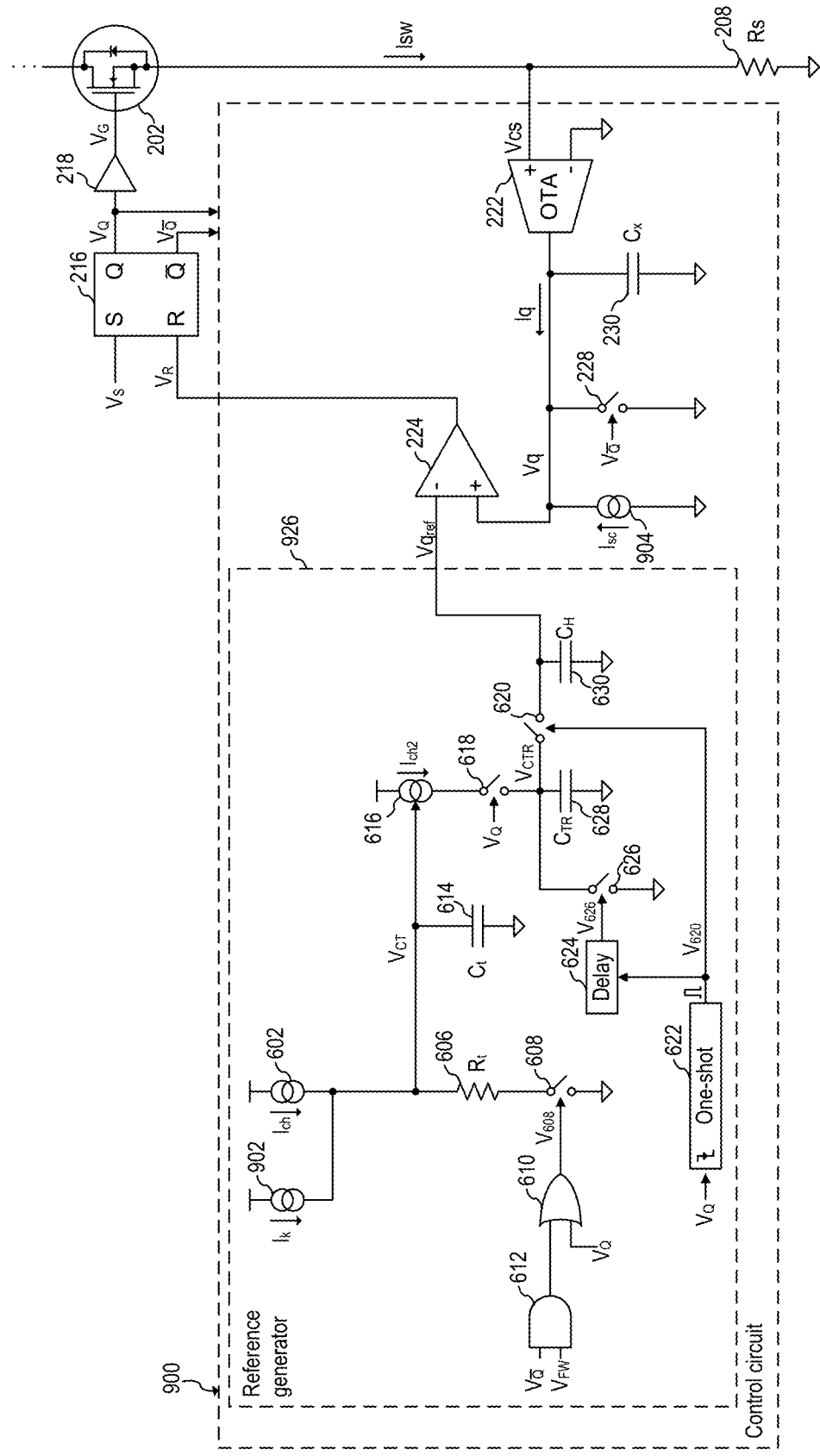
FIG. 9 shows a schematic diagram of a control circuit, according to an embodiment of the present invention.

In some embodiments, transitioning from CCM mode to DCM mode when the peak-to-peak ripple of inductor current $I_L$ is higher than twice the average of current $I_L$ may cause the duty cycle of power transistor 202 to be less than 50%. In some embodiments, duty cycles higher than 50% (and thus, $V_{LED}$ higher than $V_{in\_min}/2$) are possible while achieving an unconditionally stable charge-mode control loop by using slope compensation. For example, FIG. 9 shows a schematic diagram of control circuit 900, according to an embodiment of the present invention. Control circuit 900 includes reference generator 926, comparator 224, current source 904, switch 228, integrating capacitor 230 and transconductance amplifier 222. Reference generator 926 includes current sources 902, 602 and 616, switches, 608, 618, and 626, resistor 606, capacitors 614 and 628, OR gate 610, AND gate 612, One shot circuit 622, and delay circuit 624. Control circuit 220 may be implemented as control circuit 900.

As shown in FIG. 9, integrating capacitor 230 is charged by the sum of currents $I_q$ and $I_{sc}$. In some embodiments, current $I_{sc}$ is selected to meet the condition $$I_{sc} > Rs \cdot g_m \frac{V_{LED}}{2L} \cdot T_S \quad (20)$$

to make the charge-mode control loop unconditionally stable.

In CCM mode, current $I_{LED\_CCM}$ may be given by $$I_{LED\_CCM} = \frac{1}{Rs} \cdot \frac{1}{g_m} \cdot \left( g_{m2} \cdot \frac{C_x}{C_{TR}} \cdot I_{ch} \cdot R_t - I_{sc} \right) \quad (21)$$

where $I_{sc}$ represents the current generated by current source 904. In some embodiments, current $I_{sc}$ is matched with current $I_{ch}$, which may advantageously reduce or eliminate the degradation in accuracy exhibited by current $I_{LED}$. In some embodiments, current $I_k$ may be selected to meet the condition $$I_k = \frac{C_{TR}}{C_x} \cdot \frac{1}{g_{m2} \cdot R_t} \cdot I_{sc} \quad (22)$$

which may advantageously cause $I_{LED\_CCM}$ to be given by Equation 15 while still achieving slope compensation. In some embodiments, current generators 902 and 904 are always active and Equation 21 also applies to DCM mode.

In some embodiments, since current generator 902 is in parallel with current generator 602, current generator 902 may be omitted and the current generated by generator 602 may be increased by $I_k$ to achieve the same result. In some such embodiments, Equation 19 may be modified by replacing $I_{ch}$ with $(I_{ch}-I_k)$.

In some embodiments, buck converter 200 uses a fixed-off-time (FOT) PWM modulation. With FOT PWM modulation, in a switching cycle, power transistor 202 is turned off when the current $I_L$ reaches a predetermined value, and power transistor 202 is turned back on after a predetermined fixed time interval $T_{OFF}$ (e.g., determined by a timer circuit). Using FOT may advantageously enable the control of the average inductor current $I_{LED}$ with CCM operation by controlling the peak of current $I_L$. Using FOT PWM modulation may advantageously help solve subharmonic instability issues when buck converter 200 is operated in CCM mode by making the charge-mode control loop unconditionally stable.

Figure 10:
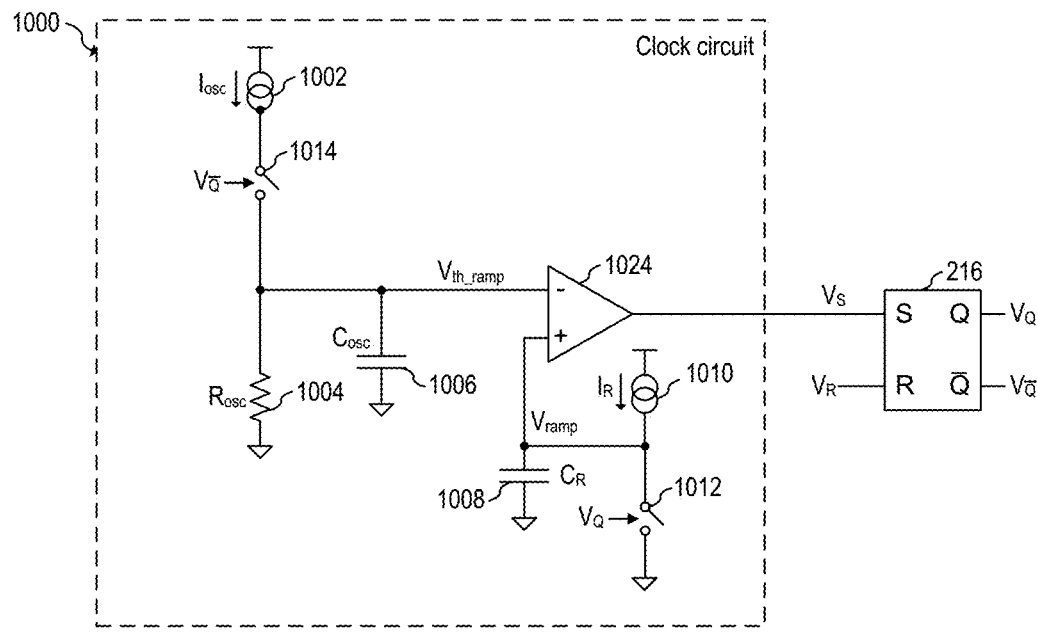
FIGS. 10 and 11 show a schematic diagram of clock circuit, and associated waveforms, respectively, according to an embodiment of the present invention.

In some embodiments, a FOT quasi-fixed frequency (FOT-QFF) modulation. FOT-QFF is based on measuring $T_{ON}$ and slowly modulate $T_{OFF}$ based on $T_{ON}$ so that the sum of $T_{ON}$ and $T_{OFF}$ is constant or substantially constant. In some embodiments, using FOT-QFF modulation may advantageously help solve subharmonic instability issues when buck converter 200 is operated in CCM mode by making the charge-mode control loop unconditionally stable while keeping the operating frequency substantially fixed. For example, FIG. 10 shows a schematic diagram of clock circuit 1000, according to an embodiment of the present invention. Clock circuit 214 may be implemented as clock circuit 1000, and may be used to operate buck converter 200 with a FOT-QFF modulation.

Figure 11:
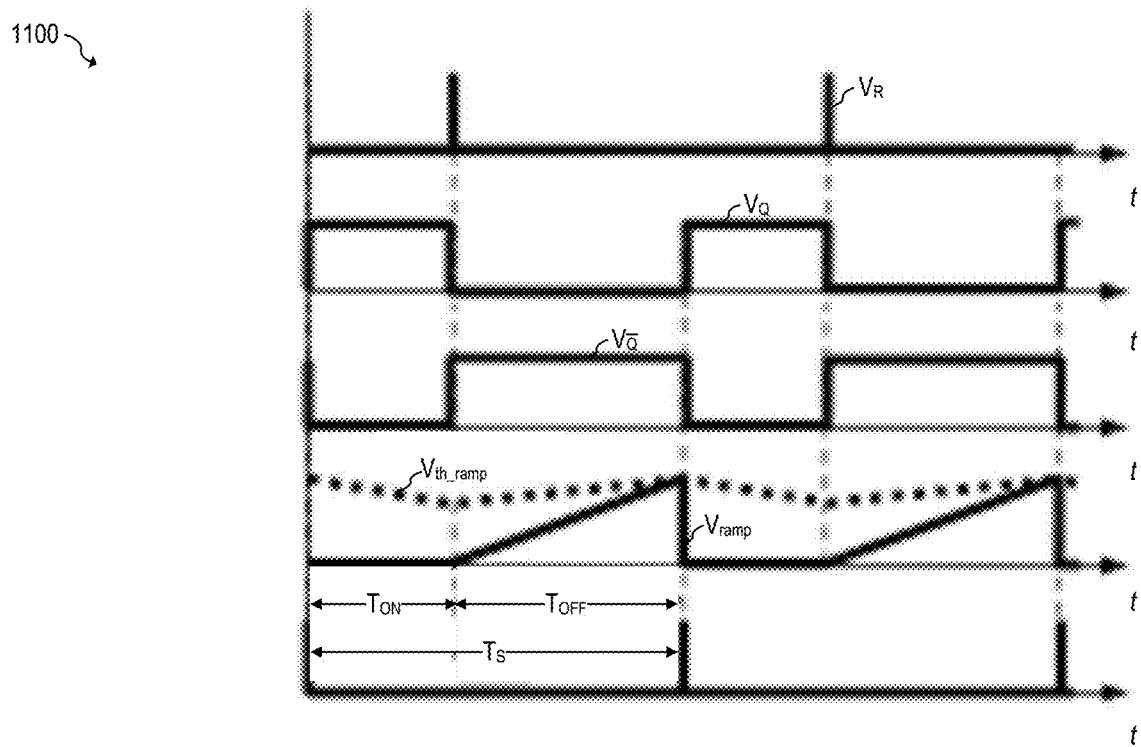

FIG. 11 shows waveforms 1100 associated with clock circuit 1000, according to an embodiment of the present invention. FIGS. 10 and 11 may be understood together.

As can be seen from FIG. 10, assuming that the time constant $R_{osc} \cdot C_{osc}$ is much larger than the switching period $T_S$ (e.g., 10 times larger, or more), voltage reference $V_{th\_ramp}$ may be given by $$V_{th\_ramp} = I_{osc} \cdot R_{osc} \cdot \frac{T_{OFF}}{T_S} \quad (23)$$

where $I_{osc}$ represents the current generated by current source 1002, and $R_{osc}$ represents the resistance of resistor 1004. Since $T_{OFF}$ may be determined by voltage $V_{ramp}$ crossing $V_{th\_ramp}$, then $$T_{OFF} = C_R \frac{V_{th\_ramp}}{I_R} = \frac{I_{osc}}{I_R} \cdot R_{osc} \cdot C_R \frac{T_{OFF}}{T_S} \quad (24)$$

where $C_R$ represents the capacitance of capacitor 1008, and $I_R$ represents the current generated by current source 1010. From Equation 21, it follows that switching period $T_s$ may be given by $$T_S = \frac{I_{osc}}{I_R} \cdot R_{osc} \cdot C_R. \quad (25)$$

In some embodiments, since the mechanism that adjusts $T_{OFF}$ responds to perturbations with a time constant $R_{osc} \cdot C_{osc}$ that is much larger than the switching period $T_s$, the dynamics of a FOT-QFF-controlled system is substantially similar to that of an FOT-controlled system.

Figure 12:
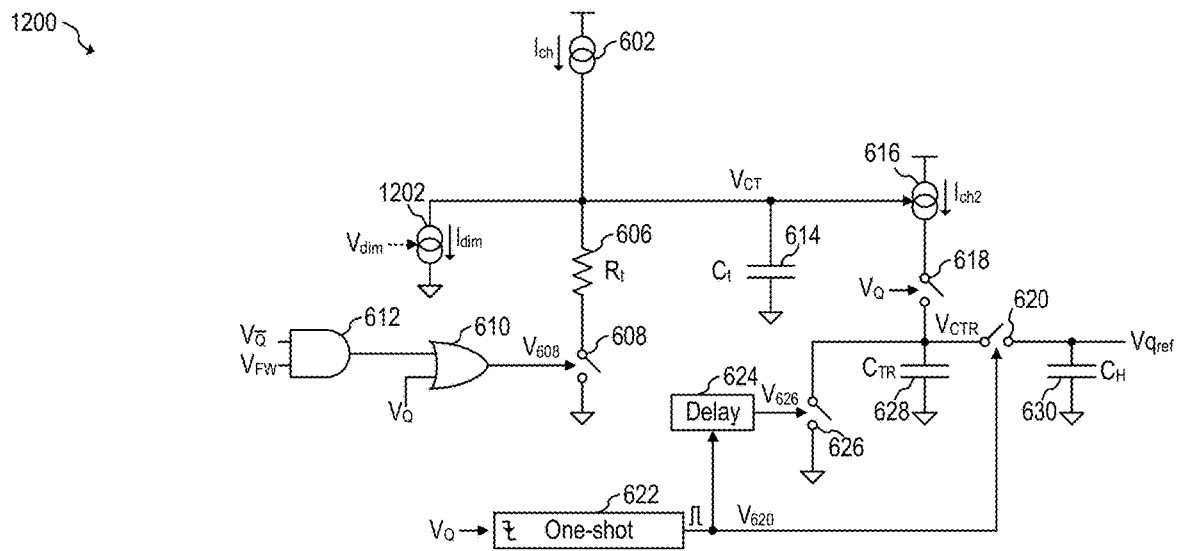
FIG. 12 shows a schematic diagram of a reference generator, according to an embodiment of the present invention.

Some embodiments allow for changing the regulation setpoint of current $I_{LED}$ in a continuous manner (analog dimming). In some embodiments, analog diming is achieved by reducing the current $I_{ch}$. For example, FIG. 12 shows a schematic diagram of reference generator 1200, according to an embodiment of the present invention. Reference generator 226 may be implemented as reference generator 1200.

Reference generator 1200 operates in a similar manner as reference generator 600. Reference generator 1200, however, includes current source 1202 for subtracting current $I_{dim}$ from reference current $I_{ch}$. Thus, in some embodiments, the average current $I_{LED}$ may be given by $$I_{LBD} = \frac{1}{Rs} \cdot \frac{g_{m2}}{g_m} \cdot \frac{C_x}{C_{TR}} (I_{ch} - I_{dim}) \cdot R_t \tag{26}$$

where $I_{dim}$ represents the current generated by current source 1202. As shown by Equation 26, current $I_{LED}$ may be reduced down to zero (by having $I_{dim}$ equal $I_{ch}$). In some embodiments, dimming may be achieved by varying current $I_{ch}$ and omitting current $I_{dim}$.

In some embodiments, current source 1202 may be a voltage-controlled current source that generates current $I_{dim}$ based on voltage $V_{dim}$, and where voltage $V_{dim}$ is received, e.g., from an input terminal of the control circuit (e.g., 220).

In some embodiments, reference generator 926 may be modified to include current source 1202 in a similar manner as shown in FIG. 12.

Looking back to FIG. 2, the propagation delay $\Delta T$ from the time in which voltage Vq is equal to $Vq_{ref}$, to the time power transistor 202 is turned off may not be insignificant. Delaying turning off power transistor 202 by $\Delta T$ may cause current $I_{LED}$ to be larger than predicted by, e.g., Equations 11 and 26. The extra inductor current $I_L$ (generated as a result of the additional time AT that power transistor 202 is on) may depend on the applied $V_{in}-V_{LED}$, thus, introducing a dependence on both $V_{in}$ and $V_{LED}$. For example, assuming that the turn-off condition of power transistor 202 occurs at time $t_{202\_off}=T_{ON}-\Delta T$, then it is possible to calculate the value of $Vq_{ref\_202\_off}$ at time $t_{202\_off}$ as $$Vq_{\_202\_off} = \frac{g_m}{C_x} \cdot \int_0^{T_{ON}-\Delta T} Rs \cdot Isw(t)dt = \frac{g_{m2} \cdot I_{ch} \cdot R_t}{C_{TR}}(T_{ON} - \Delta T) \tag{27}$$

and $I_{LED}$ (in CCM mode) may be given by $$I_{LED\_CCM} = I_{LEDo} + \frac{V_{IN} - V_{LED}}{2L} \cdot \Delta T \tag{28}$$

where $I_{LEDo}$ represents the average current $I_{LED}$ determined by, e.g., Equation 15.

Figure 13:
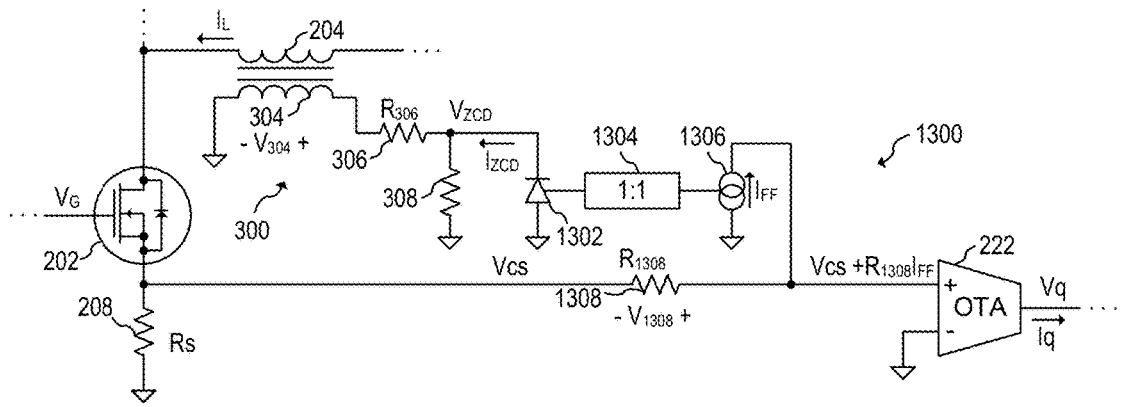
FIG. 13 shows schematic diagram of a portion of a control circuit coupled to the interface circuit of FIG. 3, according to an embodiment of the present invention.

In some embodiments, voltage feedforward is used to compensate for propagation delay $\Delta T$. For example, in some embodiments, a voltage feedforward circuit may inject a current $I_{FF}$, to be summed with current Isw, based on voltage $V_{ZCD}$ received from interface circuit 210. For example, FIG. 13 shows a schematic diagram of a portion of control circuit 1300 coupled to interface circuit 300, according to an embodiment of the present invention. Control circuit 1300 includes diode 1302, current mirror 1304, current source 1306, resistor 1308, and transconductance amplifier 222. Control circuit 220 may be implemented as control circuit 1300.

In CCM mode, during the on-time $T_{ON}$ of power transistor 202, the voltage $V_{304}$ across auxiliary winding 304 may be given by $$V_{304} = -\frac{(V_{in} - V_{LED})}{n} \tag{29}$$

where n represents the turn ration between the number of turns of inductor 204 and the number of turns of auxiliary winding 304. Current $I_{ZCD}$ may be given by $$I_{ZCD} = -\frac{(V_{in} - V_{LED})}{n \cdot R_{306}} \tag{30}$$

where $R_{306}$ represents the resistance of resistor 306.

As shown by elements 1304 and 1306, current $I_{ZCD}$ is mirrored to generate current $I_{FF}$, which causes an offset $V_{1308}$ that may be given by $$V_{1308} = R_{1308} \cdot I_{FF} \tag{31}$$

where $R_{1308}$ represents the resistance of resistor 1308. Thus, $V_{qref\_202\_off}$ may be given by $$Vq_{ref\_202\_off} = \frac{g_m}{C_x} \cdot \int_0^{T_{ON}-\Delta T}[Rs \cdot Isw(t) + V_{1308}]dt = \frac{g_{m2} \cdot I_{ch} \cdot R_t}{C_{TR}} \cdot (T_{ON} - \Delta T) \tag{32}$$

and current $I_{LED}$ may be given by $$I_{LED\_CCM} = I_{LEDo} + \frac{V_{IN} - V_{LED}}{2L} \cdot \Delta T - \frac{V_{1308}}{Rs} \tag{33}$$

In some embodiments, $R_{306}$ is selected to be $$R_{306} = \frac{2}{n} \cdot \frac{R_{1308} \cdot L}{Rs \cdot \Delta T} \tag{34}$$

to cause $I_{LED}$ to be equal to $I_{LEDo}$, and, thus, advantageously compensate for the propagation delay $\Delta T$. The same result advantageously also applies when buck converter 200 operates in DCM mode.

Figure 14:
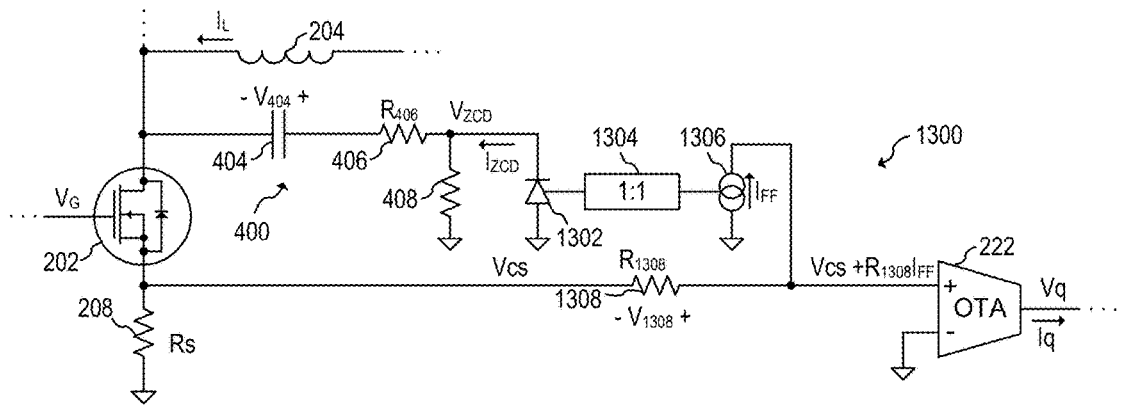
FIG. 14 shows schematic diagram of a portion of the control circuit of FIG. 13 coupled to the interface circuit of FIG. 4, according to an embodiment of the present invention.

As shown in FIG. 13, interface circuit 210 may be implemented as interface circuit 300. Other implementations are also possible. For example, FIG. 14 shows a schematic diagram of a portion of control circuit 1300 coupled to interface circuit 400, according to an embodiment of the present invention.

In CCM mode, during the on-time $T_{ON}$ of power transistor 202, the voltage $V_{404}$ across DC blocking capacitor 404 may be given by $$V_{404} = -(V_{in} - V_{LED}) \tag{35}$$

and current $I_{ZCD}$ may be given by $$I_{ZCD} = -\frac{(V_{in} - V_{LED})}{R_{406}} \tag{36}$$

where $R_{406}$ represents the resistance of resistor 406.

Equations 31-33 similarly apply to the circuit of FIG. 14. In some embodiments, $R_{406}$ is selected to be $$R_{406} = 2 \cdot \frac{R_{1308} \cdot L}{Rs \cdot \Delta T} \qquad (37)$$

to cause $I_{LED}$ to be equal to $I_{LEDO}$, and, thus, advantageously compensate for the propagation delay $\Delta T$. The same result advantageously also applies when buck converter 200 operates in DCM mode.

Advantages of some embodiments include enabling lighting engineers to design LED lamp drivers that meet market and regulatory requirements with less effort and at a lower cost.

In an embodiment, buck converter 200 is designed to receive a $V_{in}$ between 108 V to 132 V, generate a voltage $V_{LED}$ between 30 V to 90 V, produce an output current $I_{LED}$ of 1 A, having a diming range between 5% and 100%, and a programmable switching frequency $F_{SW}$ above 100 kHz (e.g., at 130 kHz, 260 kHz, etc.), where inductor 204 has an inductance L of 200 pH, where output capacitor 232 has a capacitance of 2.2 µF and where resistor 208 has a sense resistance Rs of 0.2Ω. In some embodiments, buck converter 200 includes current $I_{ch}$ of 0.75 µA, resistance $R_t$ of 4 MΩ, capacitances of $C_t$, $C_x$, and $C_{TR}$ of 50 pF, 20 pF, and 20 pF, respectively, transconductance $g_m$ and $g_{m2}$ of 15 µS and 115 µS, respectively, and a dimming gain of 1/100 A/A. Other implementations are also possible.

Figure 15:
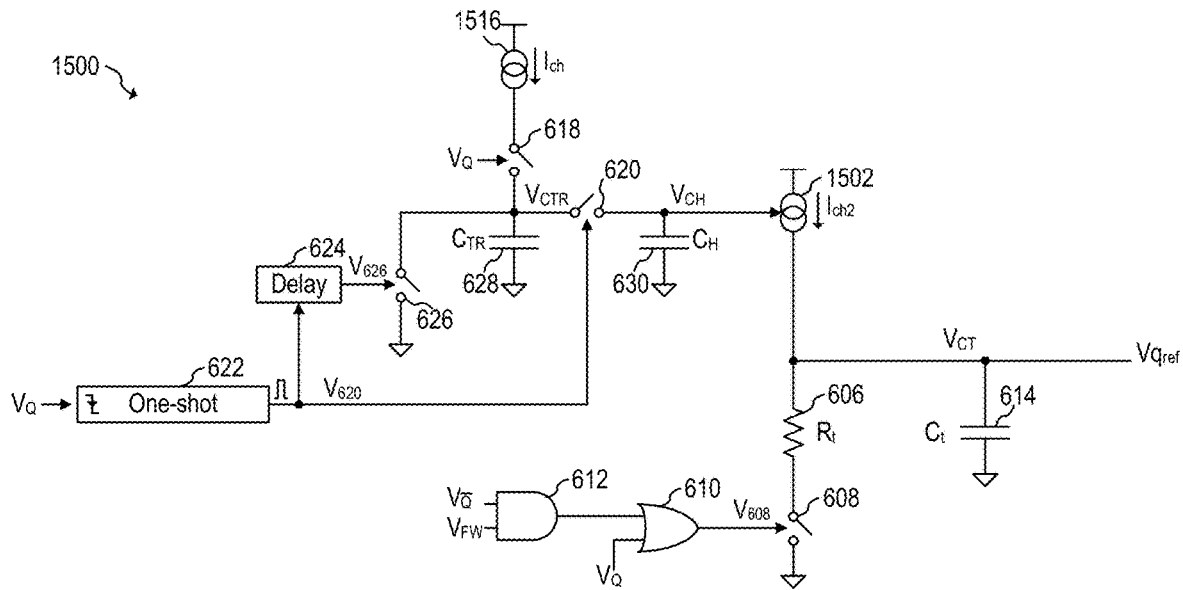
FIGS. 15-17 shows schematic diagrams of reference generators, according to embodiments of the present invention.

FIG. 15 shows a schematic diagram of reference generator 1500, according to an embodiment of the present invention. Reference generator 1500 includes current sources 1502 and 1516, switches, 608, 618, 620 and 626, resistor 606, capacitors 614, 628, and 630, OR gate 610, AND gate 612, one-shot circuit 622, and delay circuit 624. As shown in FIG. 15, Reference generator 1500 may be controlled by signals $V_Q$ and $V_{\bar{Q}}$ (e.g., from flip-flop 216) and signal $V_{FW}$ (e.g., from ZCD 212). Reference generator 220 may be implemented as reference generator 1500.

As shown in FIG. 15, capacitor 628 is charged with a constant current $I_ch$ during turn-on time $T_{ON}$. At a falling-edge of signal $V_Q$, voltage $V_{CTR}$ across capacitor 628 is transferred to capacitor 630. Thus, voltage $V_{CH}$ across capacitor 630 may be given by $$V_{CH} = V_{CTR} = \frac{I_{ch}}{C_{TR}} \cdot T_{ON} \qquad (38)$$

Current $I_{ch2}$, thus, may be given by $$I_{ch2} = g_{m2} \cdot V_{CH} = \frac{I_{ch}}{C_{TR}} \cdot T_{ON} \qquad (39)$$

where $g_{m2}$ is the transconductance of voltage-controlled current source 1502.

Considering DCM operation for simplicity, switch 608 is closed when inductor current $I_L$ is greater than zero (during time interval $T_s-T_R$). Thus, in DCM mode, $Vq_{ref}$ may be given by Equation 18. Thus, reference generator 1500 may be understood as equivalent to reference generator 600.

In some embodiments, switch 618 may be omitted, e.g., by implementing current source 1516 as a voltage-controlled current source controlled by signal $V_Q$.

Figure 16:
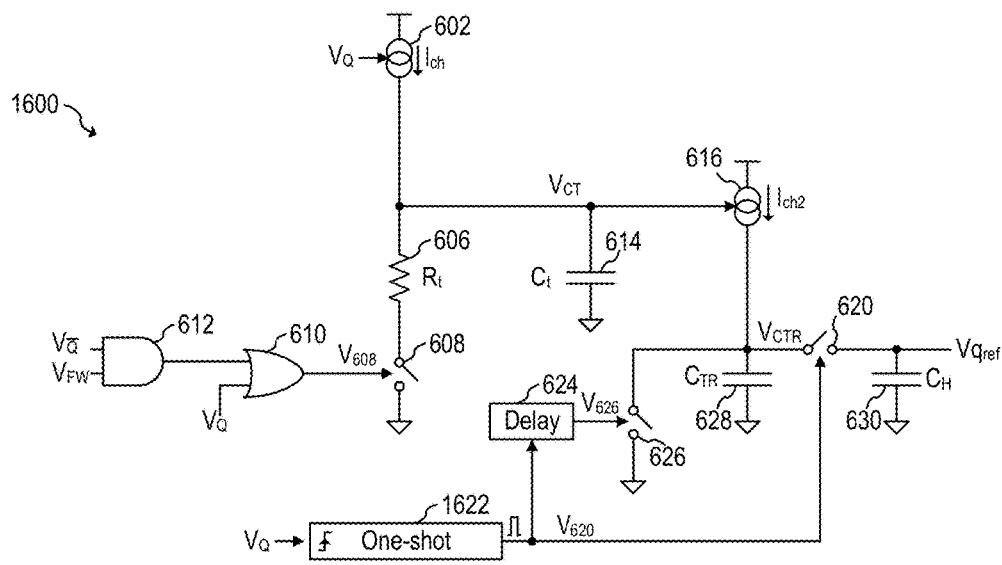

FIG. 16 shows a schematic diagram of reference generators 1600, according to an embodiment of the present invention. Reference generator 226 may be implemented as reference generator 1600. Reference generator 1600 includes current sources 602 and 616, switches 608, 620, and 626, resistor 606, capacitors 614, 628, and 630, OR gate 610, AND gate 612, one-shot circuit 1622, and delay circuit 624. As shown in FIG. 16, Reference generator 1600 may be controlled by signals $V_Q$ and $V_{\bar{Q}}$ (e.g., from flip-flop 216) and signal $V_{FW}$ (e.g., from ZCD 212).

Reference generator 1600 operates in a similar manner as reference generator 600. In reference generator 1600, however, capacitor 628 is charged during the whole switching period $T_S$. Thus, voltage $V_{CTR}$ may be given by $$V_{CTR} = \frac{I_{ch2}}{C_{TR}} \cdot T_s. \qquad (40)$$

Since voltage $V_{CT}$ across capacitor 614 (which controls current $I_{ch2}$) may be given by $$V_{CT} = R_t \cdot I_{ch} \cdot \frac{T_{ON}}{T_S - T_R} \qquad (41)$$

voltage $Vq_{ref}$, then, may be given by $$Vq_{ref} = V_{CTR} = \frac{g_{m2} \cdot R_t \cdot I_{ch}}{C_{TR}} \cdot T_{ON} \cdot \frac{T_S}{T_S - T_R} \qquad (42)$$

which is the same as Equation 18. Thus, reference generator 1600 may be understood as equivalent to reference generator 600.

In some embodiments, one shot circuit 1622 is configured to produce a pulse of predetermined duration (e.g., 20 ns) when signal $V_Q$ transitions from low to high.

Figure 17:
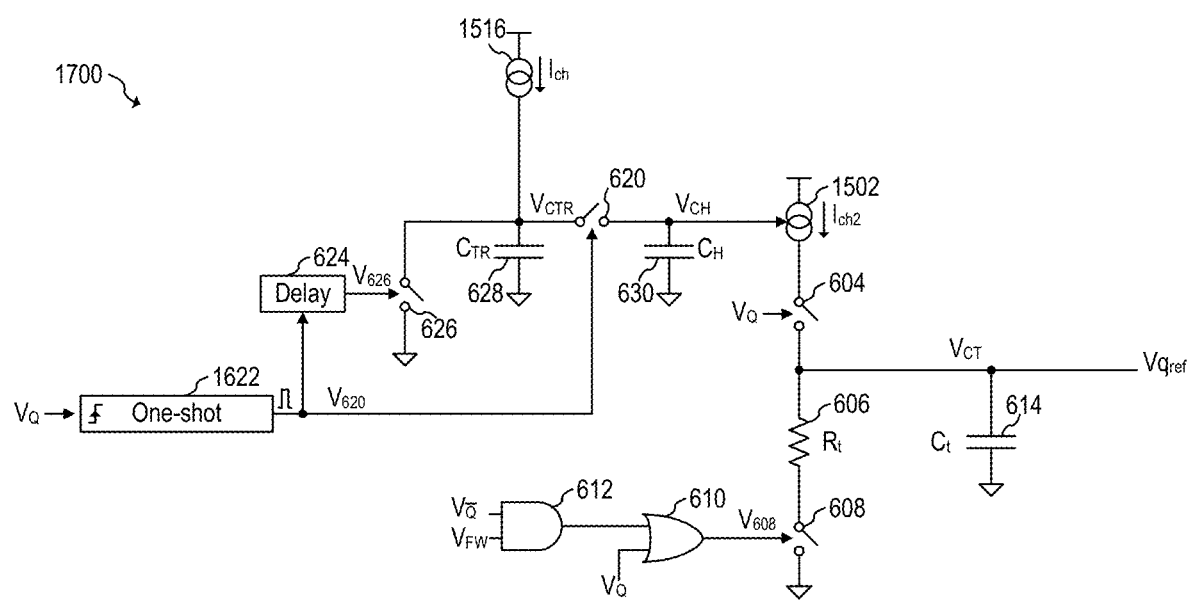

FIG. 17 shows a schematic diagram of reference generators 1700, according to an embodiment of the present invention. Reference generator 226 may be implemented as reference generator 1700. Reference generator 1700 includes current sources 1502 and 1516, switches, 608, 620 and 626, resistor 606, capacitors 614, 628, and 630, OR gate 610, AND gate 612, one-shot circuit 1622, and delay circuit 624. As shown in FIG. 17, Reference generator 1700 may be controlled by signals $V_Q$ and $V_{\bar{Q}}$ (e.g., from flip-flop 216) and signal $V_{FW}$ (e.g., from ZCD 212).

Reference generator 1700 operates in a similar manner as reference generator 1500. In reference generator 1700, however, capacitor 628 is charged during the whole switching period $T_s$. Thus, Equations 40-42 apply to reference generator 1700. Thus, reference generator 1700 may be understood as equivalent to reference generator 600.

In some embodiments in which current $I_{ch}$ is fixed, it can be derived from Equations 11 and 16 that $$\beta = \frac{I_{LED}}{I_{ch}} = \frac{1}{Rs} \cdot \frac{g_{m2}}{g_m} \cdot \frac{C_x}{C_{RT}} \cdot R_t \qquad (43)$$

where β is a constant. Thus, in some embodiments, current $I_{LED}$ is proportional to a fixed, internally generated current $I_{ch}$, where the proportionality coefficient β can be set by a user by selecting the value of resistance Rs. As previously shown, regulation of current $I_{LED}$ may be achieved by measuring only a portion of inductor current $I_L$ (the part that flows through power transistor 202), and reconstructing the missing portion based on the on ($T_{ON}$) and off ($T_{OFF}$) times of power transistor 202 (in CCM mode), and based on time ($T_{ON}$) of power transistor 202 and the demagnetization time ($T_{FW}$) (in DCM mode). In some embodiments, the information of the on and off times of power transistor 202 and of demagnetization time $T_{FW}$ is encoded in signals $V_Q$, $V_Q$, and $V_{FW}$, and is used to control switches of reference generator 226 (e.g., switches 608, 618, 620, 626) as well as other switches of the control circuit (e.g., switches 228, 1012, 1014).

As illustrated in FIG. 6, in some embodiments, switch 608 may be controlled by signals $V_Q$ OR ($V_Q$ AND $V_{FW}$) to achieve a constant average current $I_L$, e.g., to be used in LED driving or battery charging (e.g., by replacing LED string 106 with a rechargeable battery).

The inventors realized that changing the control logic of some of the switches (e.g., switches 608, 618) of control circuit 220 may allow using control circuit 220 for regulating output current ($I_{LED}$) in topologies different than a buck converter (e.g., boost, buck-boost, flyback).

Figure 18:
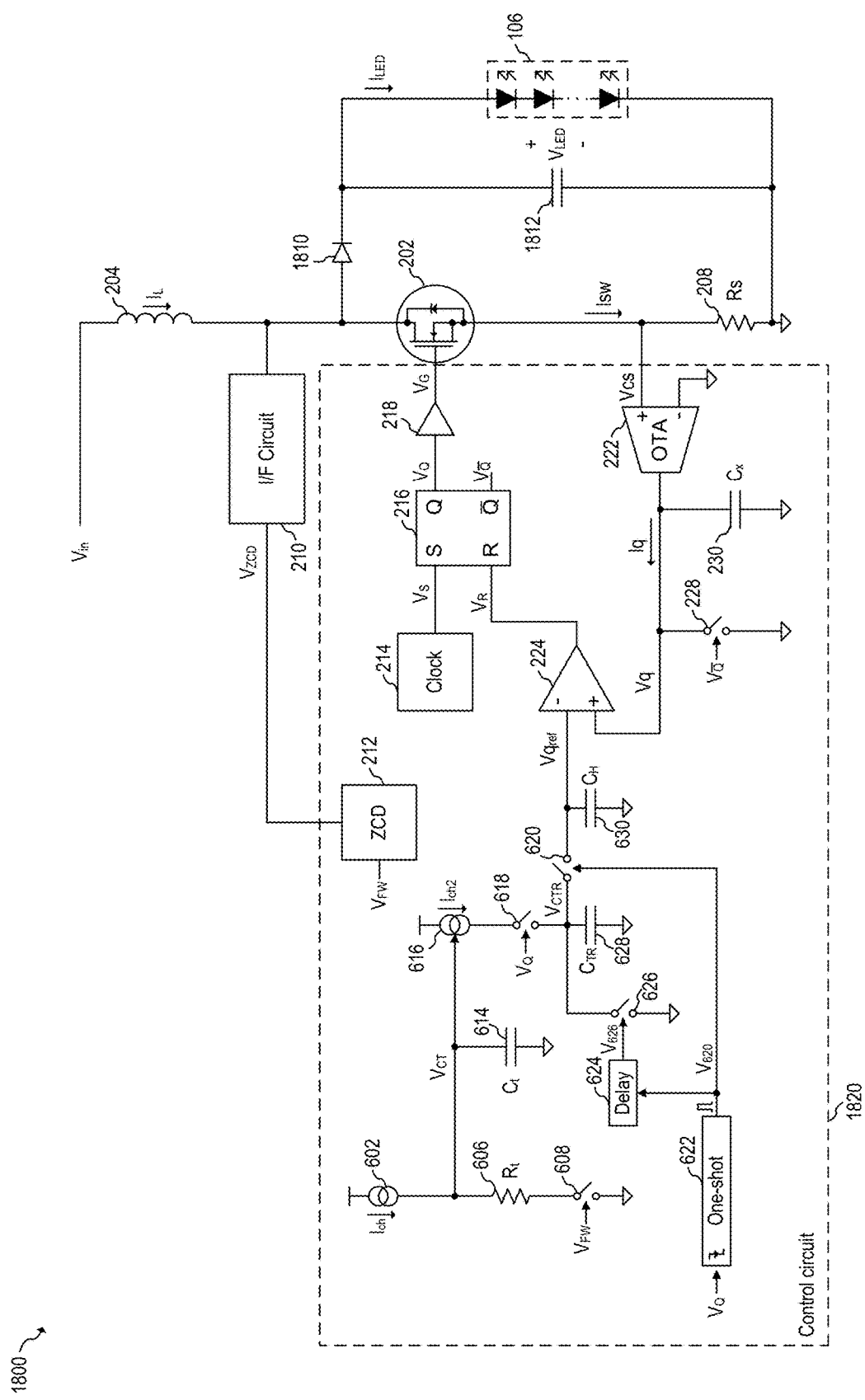
FIGS. 18-20 show schematic diagrams of switching converters, according to embodiments of the present invention.
Figure 19:
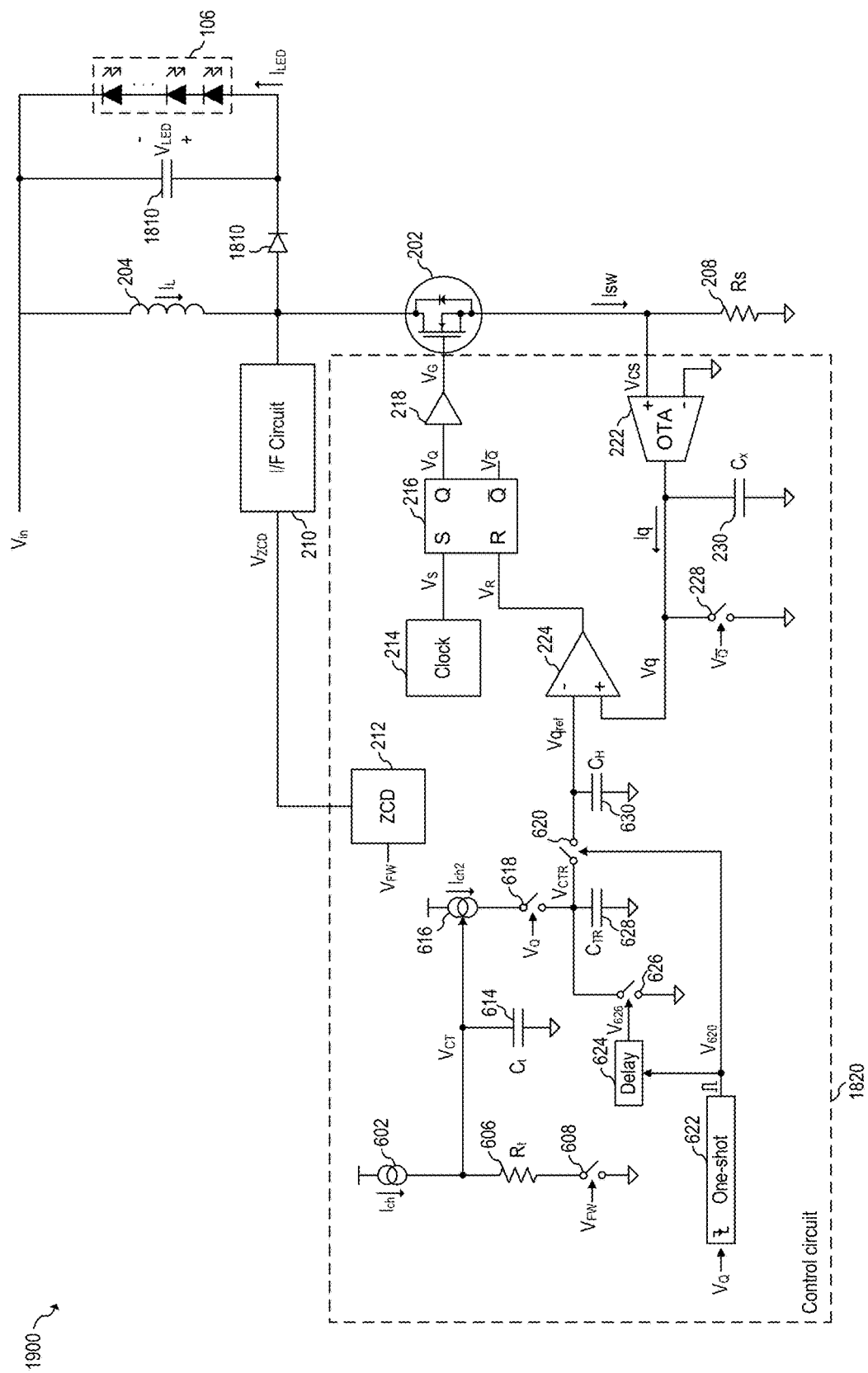
Figure 20:
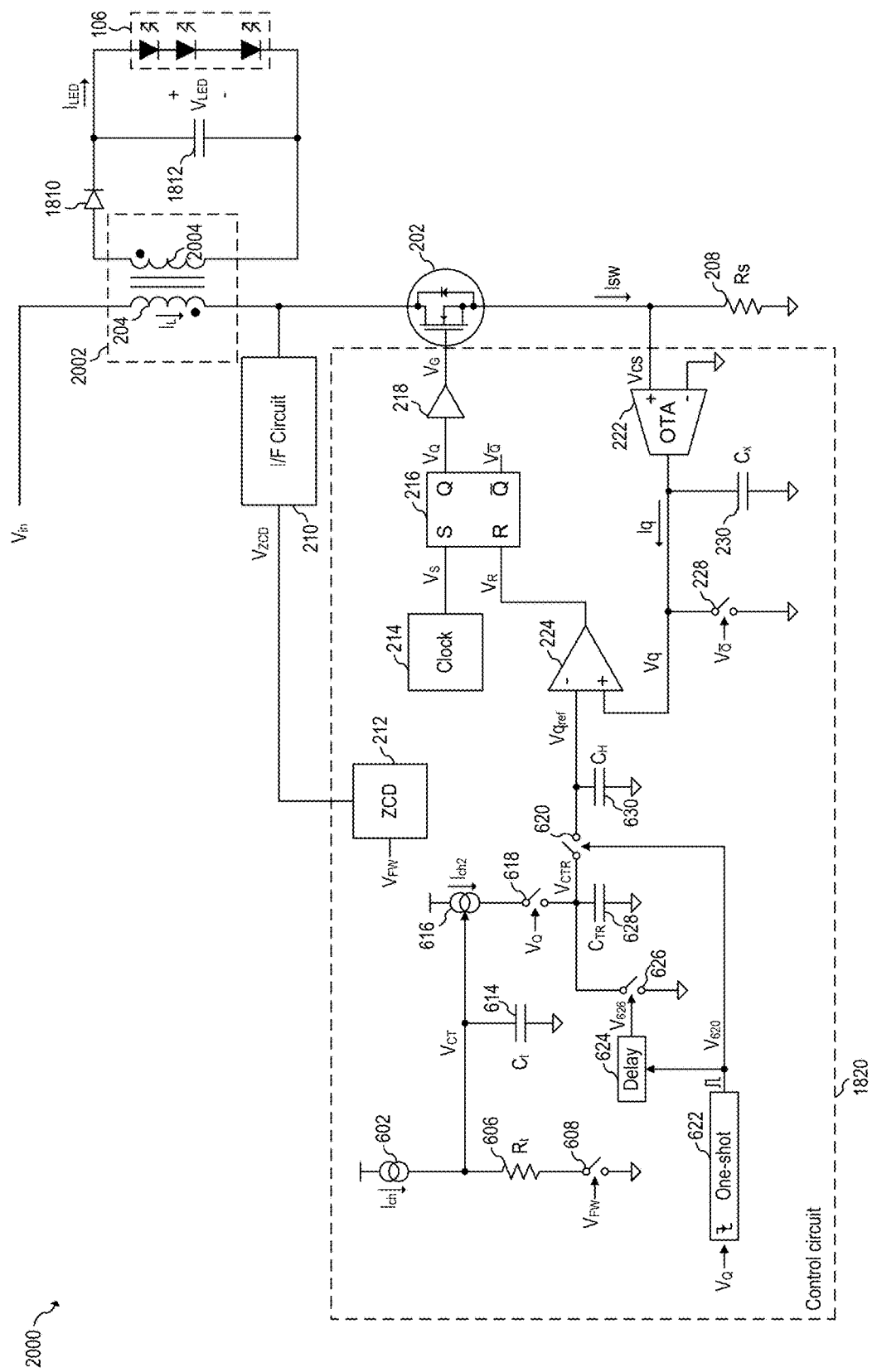

FIGS. 18-20 show schematic diagrams of switching converters, according to embodiments of the present invention.

FIG. 18 shows a schematic diagram of CCM/DCM boost converter 1800, according to an embodiment of the present invention. Boost converter 1800 includes control circuit 1820, power transistor 202, diode 1810, output capacitor 1812, inductor 204, interface circuit 210, and resistors 208. In some embodiments, boost converter 1800 regulates average current $I_{LED}$, e.g., for driving a LED string or recharging a battery, while keeping voltage $V_{LED}$ higher than voltage $V_{in}$. In some embodiments, voltage $V_{in}$ may be voltage $V_{102}$ (e.g., received from converter 102).

As shown in FIG. 18, control circuit 1820 operates in a similar manner as control circuit 220 when reference generator 226 is implemented as reference generator 600. Control circuit 1820, however, controls switch 608 with signal $V_{FW}$ instead of using signal $V_{608}$.

As can be seen from FIG. 18, voltage Vq may be given by $$Vq \propto I_{LED} \cdot Rs \cdot \frac{T_S}{T_{FW}} \cdot T_{ON} \quad (44)$$

and Vqref may be given by $$Vq_{ref} \propto \frac{T_S}{T_{FW}} \cdot T_{ON} \quad (45)$$

Thus, average output current $I_{LED}$ may be given by $$I_{LED} = \frac{1}{Rs} \cdot \frac{g_{m2}}{g_m} \cdot \frac{C_x}{C_{TR}} \cdot I_{ch} \cdot R_t \quad (46)$$

which is identical to Equation 11 when α is given by Equation 16.

FIG. 19 shows a schematic diagram of CCM/DCM buck-boost converter 1900, according to an embodiment of the present invention. Buck-boost converter 1900 includes control circuit 1820, power transistor 202, diode 1810, output capacitor 1812, inductor 204, interface circuit 210, and resistor 208. In some embodiments, buck-boost converter 1900 regulates current $I_{LED}$, e.g., for driving a LED string or recharging a battery. In some embodiments, voltage $V_{in}$ may be voltage $V_{102}$ (e.g., received from converter 102).

As shown in FIG. 19, the same control circuit 1820 may be used for buck-boost operation by changing the way diode 1810, capacitor 1812, and load 106 are connected. Equations 44-46 also apply to buck-boost converter 1900.

FIG. 20 shows a schematic diagram of CCM/DCM flyback converter 2000, according to an embodiment of the present invention. Flyback converter 2000 includes control circuit 1820, power transistor 202, diode 1810, output capacitor 1812, transformer 2000, interface circuit 210, and resistor 208. In some embodiments, flyback converter 2000 regulates current $I_{LED}$, e.g., for driving a LED string or recharging a battery. In some embodiments, voltage $V_{in}$ may be voltage $V_{102}$ (e.g., received from converter 102).

As shown in FIG. 20, the same control circuit 1820 may be used for flyback operation by replacing inductor 204 with transformer 2002, and changing the way diode 1810, capacitor 1812, and load 106 are connected.

Equations 44 and 45 also apply to flyback converter 2000. Average output current $I_{LED}$ may be given by $$I_{LED} = \frac{n}{Rs} \cdot \frac{g_{m2}}{g_m} \cdot \frac{C_x}{C_{TR}} \cdot I_{ch} \cdot R_t \quad (47)$$

where n represents the turn ratio $$\left(n = \frac{N_P}{N_S}\right)$$

transformer 2002, where $N_P$ represents the number of turns of primary winding 204, and $N_s$ represents the number of turns of secondary winding 2004.

Advantages of some embodiments include using a single-loop system, in contrast with conventional average current mode control methods that use two nested loops, each requiring frequency compensation. Using a single loop system may advantageously result in a simpler and lower cost implementation.

Additional advantages of some embodiments include more versatility, since some embodiments may control the entire inductor current $I_L$ or only part of it, which may advantageously allow usage of some embodiments for various purposes (e.g., controlling output voltage $V_{LED}$).

Example embodiments of the present invention are summarized here. Other embodiments can also be understood from the entirety of the specification and the claims filed herein.

Example 1. A control circuit including: an output terminal configured to be coupled to a control terminal of a first transistor that has a current path coupled to an inductor; a transconductance amplifier configured to produce a sense current based on a current flowing through the current path of the first transistor; and a first capacitor, where the control circuit is configured to: turn on the first transistor based on a clock signal, integrate the sense current with an integrating capacitor to generate a first voltage, generate a first current, generate a second voltage across the first capacitor based on the first current, generate a second current based on the second voltage, generate a third voltage based on the second current, turn off the first transistor when the first voltage becomes higher than the third voltage; discharge the integrating capacitor when the first transistor turns off; and regulate an average output current flowing through the inductor based on the first current.

Example 2. The control circuit of example 1, where the transconductance amplifier includes a first input configured to receive a sense voltage indicative of a current flowing through a current path of the first transistor, a second input configured to receive a reference voltage, and an output configured to deliver the sense current.

Example 3. The control circuit of one of examples 1 or 2, further including: a first current generator configured to generate the first current, the first current generator coupled to the first capacitor at a first node; and a first resistor coupled between the first node and a reference supply terminal.

Example 4. The control circuit of one of examples 1 to 3, further including a first switch coupled in series with the first resistor, where the control circuit is configured to control the first switch based on a freewheeling signal indicative of a demagnetization of the inductor.

Example 5. The control circuit of one of examples 1 to 4, where the control circuit is configured to: control the first transistor using a first signal; and control the first switch based on the freewheeling signal and based on the first signal.

Example 6. The control circuit of one of examples 1 to 5, further including a zero crossing detection circuit having an input configured to be coupled to a first current path terminal of the first transistor, where the zero crossing detection circuit is configured to generate the freewheeling signal based on the input of the zero crossing detection circuit.

Example 7. The control circuit of one of examples 1 to 6, where the zero crossing detection circuit includes: a first comparator having a first input coupled to the input of the zero crossing detection circuit, and a second input coupled to the input of the zero crossing detection circuit via a low-pass filter; and a second flip-flop having a first input coupled to an output of the first comparator, and an output configured to deliver the freewheeling signal.

Example 8. The control circuit of one of examples 1 to 7, where the control circuit is configured to generate the third voltage at a second node, the control circuit further including: a second current generator configured to generate the second current; a second switch coupled between the second current generator and the second node; and a third switch coupled between the second node and the reference supply terminal.

Example 9. The control circuit of one of examples 1 to 8, further including: a one-shot circuit having an output configured to control the second switch; and a delay circuit configured to control the third switch based on the output of the one-shot circuit.

Example 10. The control circuit of one of examples 1 to 9, further including: a fourth switch coupled between the second current generator and a third node that is coupled between the second switch and the third switch; a second capacitor is coupled between the third node and the reference supply terminal; and a third capacitor coupled between the second node and the reference supply terminal, where the control circuit is configured to generate the third voltage across the third capacitor.

Example 11. The control circuit of one of examples 1 to 10, where the control circuit is configured to generate the third voltage at a second node, the control circuit further including: a first current generator configured to generate the second current, the first current generator coupled to the second node; a first resistor coupled between the second node and a reference supply terminal; and a first switch coupled in series with the first resistor, where the control circuit is configured to control the first switch based on a freewheeling signal indicative of a demagnetization of the inductor.

Example 12. The control circuit of one of examples 1 to 11, further including: a first comparator having a first input configured to receive the first voltage, a second input configured to receive the third voltage; and a first flip-flop having a first output coupled to the output terminal, a first input configured to receive the clock signal, and a second input coupled to an output of the first comparator.

Example 13. The control circuit of one of examples 1 to 12, further including a current mirror configured to be coupled to a first current path terminal of the first transistor via an interface circuit, where the current mirror is configured to inject a first current into a first input of the transconductance amplifier based on a current flowing through the interface circuit.

Example 14. The control circuit of one of examples 1 to 13, further including a sense resistor coupled between first and second inputs of the transconductance amplifier.

Example 15. The control circuit of one of examples 1 to 14, further including a clock circuit configured to generate the clock signal.

Example 16. The control circuit of one of examples 1 to 15, where the clock circuit is configured to generate the clock signal with a fixed frequency.

Example 17. The control circuit of one of examples 1 to 16, where the clock circuit includes: a first switch having a first terminal configured to receive an oscillator current; a first resistor coupled to a second terminal of the first switch; a second capacitor coupled to the first resistor; a first comparator having a first input coupled to the second terminal of the first switch, and an output configured to deliver the clock signal; a third capacitor coupled to a second input of the first comparator; a first current generator coupled to the third capacitor and to the second input of the first comparator; and a second switch coupled across the third capacitor.

Example 18. The control circuit of one of examples 1 to 17, where the control circuit is integrated in a single integrated circuit.

Example 19. The control circuit of one of examples 1 to 18, further including a gate driver having an input coupled to the output terminal, and where the first transistor is a power metal-oxide semiconductor field-effect transistor (MOSFET) or GaN transistor having a gate coupled to an output of the gate driver.

Example 20. A method for regulating an average output current flowing through an inductor, the method including: turning on a power transistor based on a clock signal, where a current path of the power transistor is coupled to the inductor; generating a sense current based on a current flowing through the current path of the power transistor; integrating the sense current with an integrating capacitor to generate a first voltage; generating a first current; generating a second voltage across a first capacitor based on the first current; generating a second current based on the second voltage; generating a third voltage across a second capacitor based on the second current; turning off the power transistor when the first voltage becomes higher than the third voltage; discharging the integrating capacitor when the power transistor turns off; and regulating the average output current based on the first current.

Example 21. The method of example 20, further including generating a sense voltage based on the current flowing through the current path of the power transistor, where generating the sense current includes generating the sense current based on the sense voltage using a transconductance amplifier.

Example 22. The method of one of examples 20 or 21, further including: generating the first current with a first current generator; detecting a demagnetization time of the inductor; and controlling a first switch based on the detected demagnetization time, the first switch coupled to the first current generator via a first resistor.

Example 23. The method of one of examples 20 to 22, where the average output current is proportional to the first current.

Example 24. The method of one of examples 20 to 23, further including varying a switching frequency of the power transistor without causing a substantial change in a magnitude of the average output current.

Example 25. The method of one of examples 20 to 24, where the second voltage is substantially constant.

Example 26. A switching converter including: a power transistor; a sense resistor coupled to a current path of the power transistor; an inductor coupled to the current path of the power transistor; a driver having an output coupled to a control terminal of the power transistor; a flip-flop having a first output coupled to an input of the driver, and a first input configured to receive a clock signal, where the flip-flop is configured to produce a first signal at the first output of the flip-flop, and where the flip-flop is configured to cause the power transistor to turn on using the first signal based on the clock signal; a first comparator having an output coupled to a second input of the flip-flop, where the flip-flop is configured to cause the power transistor to turn off using the first signal based on the output of the first comparator; a transconductance amplifier having a first and second inputs respectively coupled to first and second terminals of the sense resistor, and an output coupled to a first input of the first comparator; an integrating capacitor coupled to the output of the transconductance amplifier and to the first input of the first comparator; a first switch coupled to the integrating capacitor, the first switch configured to discharge the integrating capacitor when the power transistor turns off; a zero crossing detection circuit having an input coupled to the current path of the power transistor and to the inductor, where the zero crossing detection circuit is configured to generate a freewheeling signal based on a demagnetization of the inductor; a first current generator configured to generate a first current, the first current generator coupled to a first capacitor at a first node; a first resistor coupled between the first node and a reference supply terminal; a second switch coupled in series with the first resistor and configured to be controlled based on the freewheeling signal; a second current generator configured to generate a second current based on a voltage at the first node; a third switch coupled between the second current generator and a second input of the transconductance amplifier; and a fourth switch coupled between the third switch and the reference supply terminal.

Example 27. The switching converter of example 26, further including: a one-shot circuit having an input configured to receive the first signal, and an output configured to control the third switch; and a delay circuit configured to control the fourth switch based on the output of the one-shot circuit.

Example 28. The switching converter of one of examples 26 or 27, further including: an input terminal configured to receive an input voltage, the input terminal configured to be coupled to a first terminal of a load; and a diode coupled between a first terminal of the inductor and the input terminal, where a second terminal of the inductor is configured to be coupled to a second terminal of the load.

Example 29. The switching converter of one of examples 26 to 28, further including the load, where the load includes a light emitting diode (LED) string.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A control circuit, comprising:
   an output terminal couplable to a control terminal of a transistor, the transistor having a current path coupled to an inductor;
   a transconductance amplifier couplable to the current path of the transistor;
   a zero crossing detection circuit couplable to an interface circuit, the interface circuit coupled to the inductor;
   a comparator having a first input terminal coupled to the transconductance amplifier;
   a clock circuit;
   a first flip-flop having a first output terminal, a first input terminal, and a second input terminal, the first output terminal coupled to the output terminal of the control circuit, the first input terminal coupled to the clock circuit, and the second input terminal coupled to an output of the comparator; and
   a reference generator having an output terminal coupled to a second input terminal of the comparator.

2. The control circuit of claim 1, wherein the zero crossing detection circuit is configured to generate a freewheeling signal indicative of a demagnetization of the inductor at an output terminal of the zero crossing detection circuit.

3. The control circuit of claim 1, wherein the reference generator comprises a first input terminal, a second input terminal, and a third input terminal, the first input terminal being coupled to an output terminal of the zero crossing detection circuit, the second input terminal being coupled to the first output terminal of the first flip-flop, and the third input terminal being coupled to a second output terminal of the first flip-flop.

4. The control circuit of claim 1, wherein the transconductance amplifier is configured to:
   receive a sense voltage indicative of a current flowing through the current path of the transistor;
   receive a reference voltage; and
   produce a sense current based on a current flowing through the current path of the transistor in response to receiving the sense voltage and the reference voltage.

5. The control circuit of claim 1, wherein the zero crossing detection circuit comprises:
   a second flip-flop having a first input terminal, a second input terminal, and a first output terminal, the first input terminal coupled to a second output terminal of the first flip-flop, and the first output terminal of the second flip-flop corresponding to an output terminal of the zero crossing detection circuit;
   an OR gate having an output terminal, a first input terminal, and a second input terminal, the output terminal of the OR gate coupled to the second input terminal of the second flip-flop, the first input terminal of the OR gate coupled to the first output terminal of the first flip-flop;

a second comparator having an output terminal coupled to the second input terminal of the OR gate; and a low pass filter coupled to an input terminal of the second comparator.

6. The control circuit of claim 1, further comprising a current mirror couplable to the current path terminal of the transistor via the interface circuit, wherein the current mirror is configured to inject a first current into a first input of the transconductance amplifier based on a current flowing through the interface circuit.

7. The control circuit of claim 1, wherein a first input terminal of the transconductance amplifier is couplable to a first terminal of a sense resistor, and wherein a second input terminal of the transconductance amplifier is couplable to a second terminal of the sense resistor.

8. A buck converter, comprising:
a transistor;
an inductor coupled to a current path of the transistor;
an interface circuit coupled to the inductor and the current path of the transistor;
a transconductance amplifier coupled to the current path of the transistor;
a zero crossing detection circuit coupled to the interface circuit;
a comparator having a first input terminal coupled to the transconductance amplifier;
a clock circuit;
a first flip-flop having a first output terminal, a first input terminal, and a second input terminal, the first output terminal coupled to the transistor, the first input terminal coupled to the clock circuit, and the second input terminal coupled to an output of the comparator; and
a reference generator having an output terminal coupled to a second input terminal of the comparator.

9. The buck converter of claim 8, further comprising a gate driver arranged between the first output terminal of the first flip-flop and the transistor, wherein the transistor is a power metal-oxide semiconductor field effect transistor (MOSFET) or a Gallium Nitride (GaN) transistor.

10. The buck converter of claim 8, wherein the buck converter is couplable to a load being driven by the buck converter.

11. The buck converter of claim 10, wherein the load is a light emitting diode (LED) string, a rechargeable battery, or a combination thereof.

12. The buck converter of claim 8, wherein the zero crossing detection circuit comprises:
a second flip-flop having a first input terminal, a second input terminal, and a first output terminal, the first input terminal coupled to a second output terminal of the first flip-flop, and the first output terminal of the second flip-flop corresponding to an output terminal of the zero crossing detection circuit;
an OR gate having an output terminal, a first input terminal, and a second input terminal, the output terminal of the OR gate coupled to the second input terminal of the second flip-flop, the first input terminal of the OR gate coupled to the first output terminal of the first flip-flop;
a second comparator having an output terminal coupled to the second input terminal of the OR gate; and
a low pass filter coupled to an input terminal of the second comparator.

13. The buck converter of claim 12, wherein the zero crossing detection circuit is configured to generate a freewheeling signal indicative of a demagnetization of the inductor at the output terminal of the zero crossing detection circuit.

14. The buck converter of claim 8, further comprising:
an input terminal configured to receive an input voltage and couplable to a first terminal of a load; and
a diode coupled between a first terminal of the inductor and the input terminal of the buck converter, wherein a second terminal of the inductor is couplable to a second terminal of the load.

15. A method, comprising:
integrating a sense current using an integrating capacitor to generate a first voltage, the sense current being based on a current flowing through a current path of a power transistor in an ON state, the power transistor being coupled to an inductor;
generating a second voltage across a first capacitor based on a first current;
generating a third voltage across a second capacitor based on a second current, the second current being associated with the second voltage;
turning OFF the power transistor and discharging the integrating capacitor in response to the first voltage exceeding the third voltage; and
regulating an average output current flowing through the inductor based on the first current.

16. The method of claim 15, wherein the average output current is proportional to the first current.

17. The method of claim 15, wherein the method further comprises varying a switching frequency of the power transistor without causing a substantial change in a magnitude of the average output current.

18. The method of claim 15, wherein the second voltage is substantially constant.

19. The method of claim 15, wherein the inductor is couplable to a load, and wherein the load is a light emitting diode (LED) string, a rechargeable battery, or a combination thereof.

20. The method of claim 15, wherein the method further comprises:
detecting a demagnetization time of the inductor; and
controlling a first switch based on the detected demagnetization time.

* * * * *